(12) United States Patent
Patel et al.

(10) Patent No.: US 12,293,660 B2
(45) Date of Patent: May 6, 2025

(54) METHODS AND SYSTEMS FOR VEHICLE ALERTING BASED ON THE FUNCTIONAL CLASSIFICATION OF ROADS

(71) Applicant: HAAS, Inc., Chicago, IL (US)

(72) Inventors: Jigar Patel, Arlington Heights, IL (US); Cory Hohs, Chicago, IL (US); Jeremy Agulnek, Chicago, IL (US)

(73) Assignee: HAAS, Inc., Chicago, IL (US)

( * ) Notice: Subject to any disclaimer, the term of this patent is extended or adjusted under 35 U.S.C. 154(b) by 112 days.

(21) Appl. No.: 18/378,605

(22) Filed: Oct. 10, 2023

(65) Prior Publication Data

US 2024/0169832 A1 May 23, 2024

Related U.S. Application Data

(63) Continuation-in-part of application No. 17/990,592, filed on Nov. 18, 2022, now Pat. No. 12,063,572.

(51) Int. Cl.
   *G08G 1/16* (2006.01)
   *G08G 1/0967* (2006.01)
   *H04L 67/12* (2022.01)

(52) U.S. Cl.
   CPC .......... *G08G 1/0967* (2013.01); *H04L 67/12* (2013.01)

(58) Field of Classification Search
   CPC . G08G 1/0967; G08G 1/096741; H04L 67/12
   See application file for complete search history.

(56) References Cited

U.S. PATENT DOCUMENTS

| | | |
|---|---|---|
| 8,466,805 B2 | 6/2013 | Waymire |
| 8,612,131 B2 | 12/2013 | Gutierrez et al. |
| 9,333,913 B1 | 5/2016 | Elders et al. |
| 9,396,210 B1 | 7/2016 | Crook et al. |
| 9,648,107 B1 | 5/2017 | Penilla et al. |
| 10,127,813 B2 | 11/2018 | Walsh et al. |
| 10,169,991 B2 | 1/2019 | Massey et al. |
| 10,189,483 B2 | 1/2019 | Grossman |

(Continued)

OTHER PUBLICATIONS

International Search and Written Opinion, PCT/US2023/080356, Apr. 5, 2024, 14 pgs.

(Continued)

*Primary Examiner* — An T Nguyen
(74) *Attorney, Agent, or Firm* — LOZA & LOZA, LLP

(57) ABSTRACT

A method for vehicle alerting includes receiving, at a cloud computing system, digital data that includes a location of a vehicle and a hazard lights on status of the vehicle, determining a functional classification of a road that corresponds to the location of the vehicle, wherein the digital data is received from the vehicle via a wireless connection, and determining whether to initiate an alert messaging operation in response to the functional classification of the road and the hazard lights on status, wherein determining whether to initiate the alert messaging operation involves selecting from available options of 1) initiating the alert messaging operation when the functional classification of the road is determined to be within a first set of functional classifications, and 2) not initiating the alert messaging operation when the functional classification of the road is determined to be within a second set of functional classifications.

11 Claims, 14 Drawing Sheets

(56) References Cited

U.S. PATENT DOCUMENTS

| | | |
|---|---|---|
| 10,582,354 B1 | 3/2020 | Isaac et al. |
| 11,587,441 B1* | 2/2023 | Cheng ................... G07C 5/085 |
| 12,109,938 B2 | 10/2024 | Tucker et al. |
| 12,217,606 B1* | 2/2025 | Cheng .............. G08G 1/096741 |
| 2006/0058950 A1 | 3/2006 | Kato et al. |
| 2009/0309709 A1 | 12/2009 | Bevacqua et al. |
| 2010/0289659 A1 | 11/2010 | Verbil |
| 2012/0139760 A1 | 6/2012 | Bevacqua et al. |
| 2015/0279125 A1 | 10/2015 | Chronowski et al. |
| 2016/0098868 A1 | 4/2016 | Lambert et al. |
| 2016/0133130 A1 | 5/2016 | Grimm et al. |
| 2016/0198002 A1 | 7/2016 | Penilla et al. |
| 2016/0203652 A1 | 7/2016 | Throop et al. |
| 2016/0293008 A1 | 10/2016 | Nagata et al. |
| 2017/0084175 A1 | 3/2017 | Sedlik et al. |
| 2017/0144669 A1 | 5/2017 | Spata |
| 2017/0249839 A1 | 8/2017 | Becker et al. |
| 2017/0268896 A1 | 9/2017 | Bai et al. |
| 2020/0037115 A1 | 1/2020 | Ady et al. |
| 2020/0101844 A1 | 4/2020 | Miller, Jr. et al. |
| 2020/0108835 A1* | 4/2020 | Suzuki ................... G07C 5/008 |
| 2020/0126412 A1 | 4/2020 | James |
| 2021/0035378 A1 | 2/2021 | Lekutai |
| 2021/0049909 A1 | 2/2021 | Tucker et al. |
| 2021/0097311 A1 | 4/2021 | McBeth et al. |
| 2021/0127062 A1 | 4/2021 | Kuehnle |
| 2022/0013006 A1 | 1/2022 | Srivastava et al. |
| 2022/0068130 A1 | 3/2022 | Brooks et al. |
| 2022/0208006 A1* | 6/2022 | Winzell ................ H04W 4/029 |
| 2022/0406172 A1 | 12/2022 | Mezaael |
| 2024/0067087 A1 | 2/2024 | Tucker et al. |
| 2024/0085214 A1 | 3/2024 | Nayak et al. |
| 2024/0094010 A1 | 3/2024 | Bernhardt et al. |

OTHER PUBLICATIONS

Notice of Allowance for U.S. Appl. No. 18/912,425, dated Jan. 29, 2025, 7 pages.

Notice of Allowance (U.S. Appl. No. 17/990,592) dated Jul. 9, 2024, 23 pgs.

Non-Final Office Action for U.S. Appl. No. 18/912,425, dated Nov. 25, 2024, 22 pages.

Chen, Lei et al. "Cloud-based traffic control for interaction between autonomous vehicles and emergency vehicles", 26th ITS World Congress, Singapore, Oct. 21-25, 2019, 11 pgs.

* cited by examiner

800

| Parameter | Alert Mode | Conservation Mode |
|---|---|---|
| Frequency Of Transmissions | 10 Per Minute | 2 Per Minute |
| Content A (e.g., Longitude/Latitude) | Included | Included |
| Content B (e.g., Speed And Direction) | Included | Not Included |
| Physical Channel Options | All Available Channels | Only Energy Efficient Channels |
| Network Options 5G Vs 3/4G? | 3G, 4G, Or 5G | 3G Or 4G |

| Functional Classification Legend | | Alert If Hazard Lights On |
|---|---|---|
| Functional Classification Name | FC Code | |
| Interstate | FC 1 | Yes |
| Other Freeways Or Expressways | FC 2 | Yes |
| Other Principal Arterial | FC 3 | Yes |
| Minor Arterial | FC 4 | No |
| Major Collector | FC 5 | No |
| Minor Collector | FC 6 | No |
| Local | FC 7 | No |

FIG. 12

METHODS AND SYSTEMS FOR VEHICLE ALERTING BASED ON THE FUNCTIONAL CLASSIFICATION OF ROADS

CROSS-REFERENCE TO RELATED APPLICATIONS

The current application is a Continuation in Part of pending U.S. application Ser. No. 17/990,592, filed Nov. 18, 2022, which is hereby incorporated by reference.

BACKGROUND

When monitoring vehicles, safety hazards, and other alerts over wireless connections, safety systems may collect data according to various fixed configurations. For example, data may be collected according to fixed configurations that involve a predetermined reporting frequency, which may be difficult to change. Consequently, because the fixed configuration may be difficult to change, collecting data over wireless connections according to such fixed configurations can be a drag on resources such as bandwidth (e.g., wireless network bandwidth).

SUMMARY

Embodiments of a method and non-transitory computer readable mediums for vehicle alerting are disclosed. In an embodiment, the method for vehicle alerting includes receiving, at a cloud computing system, digital data that includes a location of a vehicle and a hazard lights on status of the vehicle, determining, by the cloud computing system, a functional classification of a road that corresponds to the location of the vehicle, wherein the digital data is received from the vehicle via a wireless connection, and determining, by the cloud computing system, whether to initiate an alert messaging operation in response to the functional classification of the road and the hazard lights on status, wherein determining whether to initiate the alert messaging operation involves selecting from available options of 1) initiating the alert messaging operation when the functional classification of the road is determined to be within a first set of functional classifications, and 2) not initiating the alert messaging operation when the functional classification of the road is determined to be within a second set of functional classifications.

In an example, the first set of functional classifications (FC) includes FC1-FC3, and wherein the second set of functional classifications includes FC4-FC7.

In an example, The method of claim 1, wherein the first set of functional classifications includes interstate, other freeways or expressways, and other principal arterial roadways, and wherein the second set of functional classifications includes minor arterial, major collector, minor collector, and local roadways.

In an example, functional classifications of roads are functional classifications as defined by a government transportation agency.

In an example, the digital data received at the cloud computing system includes a hazard lights status field.

In an example, the digital data received at the cloud computing system includes a hazards lights on code.

In an example, the hazard lights on status corresponds to hazard lights being activated on the vehicle.

In an example, the alert messaging operation involves indicating that an alert message should be wirelessly transmitted in an alerting zone around the location of the vehicle.

In an example, the method further includes determining vehicles that are within the alerting zone, and transmitting the alert message to those vehicles within the alerting zone.

In an example, the digital data is included in a vehicle data message that includes a vehicle identifier (ID) that corresponds to the vehicle, location information that corresponds to the location of the vehicle, and a hazard lights on code that indicates the vehicle has hazard lights on.

In another example, a non-transitory computer readable medium includes instructions to be executed in a computer system, wherein the instructions when executed in the computer system perform a method that involves receiving, at a cloud computing system, digital data that includes a location of a vehicle and a hazard lights on status of the vehicle, determining, by the cloud computing system, a functional classification of a road that corresponds to the location of the vehicle, wherein the digital data is received from the vehicle via a wireless connection, and determining, by the cloud computing system, whether to initiate an alert messaging operation in response to the functional classification of the road and the hazard lights on status, wherein determining whether to initiate the alert messaging operation involves selecting from available options of 1) initiating the alert messaging operation when the functional classification of the road is determined to be within a first set of functional classifications, and 2) not initiating the alert messaging operation when the functional classification of the road is determined to be within a second set of functional classifications.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 8 is a table defining parameters of data reporting modes.

FIG. 12 is an example decision chart that shows functional classifications of roads and corresponding alert messaging rules.

Throughout the description, similar reference numbers may be used to identify similar elements.

DETAILED DESCRIPTION

Figure 1:
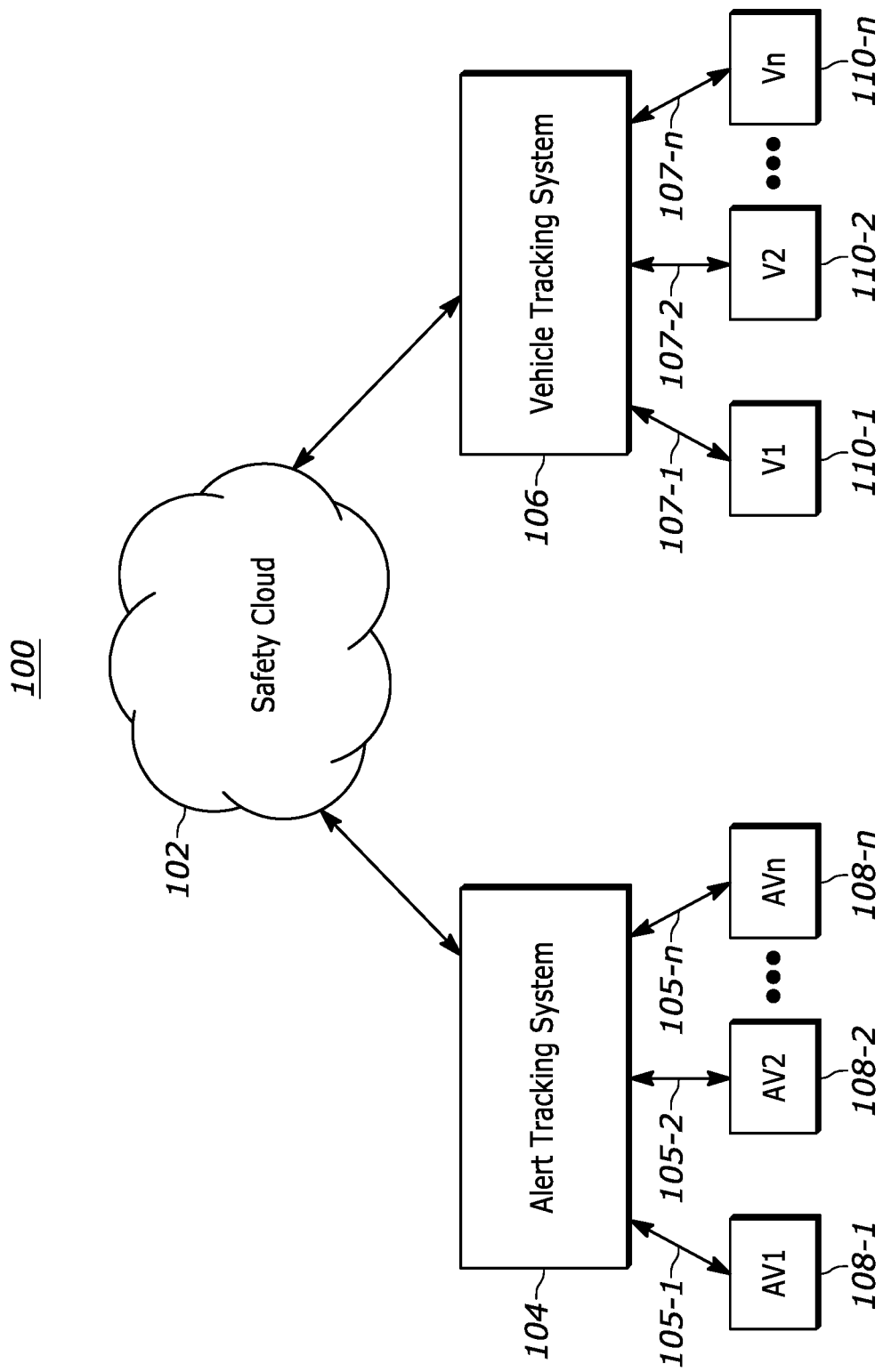
FIG. 1 is a high-level overview of a safety system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

A device may be implemented in a safety system to track vehicles (e.g., alerting vehicles and/or consumer vehicles). As an example, the safety system may be implemented by a computer system that connects to the safety system and to a transceiver of one or more vehicles. In such an example, the computer system may communicate information between the safety system and the vehicle to track the vehicle and/or send alerts when the vehicle may be near an alerting zone (e.g., a safety hazard, an emergency vehicle route, a construction zone, etc.).

In some embodiments, location data is shared with the safety system by the computer system and/or directly from the vehicles. Parameters associated with sharing the location data may be dependent on whether a vehicle is in an alerting zone. Vehicles may send vehicle data to the computer system and/or to the software system over a wireless connection according to a fixed configuration. In some embodiments, sending the vehicle data over a wireless connection according to the fixed configuration includes sending the vehicle data at a fixed to frequency (e.g., once per second) and including certain content, e.g., vehicle information, location information, etc. In such an embodiment, the vehicle data sent over a wireless connection according to the fixed configuration may be considered static because the fixed configuration remains unchanged regardless of whether the vehicle is in or outside an alerting zone.

Consequently, more resources (e.g., wireless bandwidth and power) than needed may be consumed when the vehicle is not near an alerting zone, or inadequate resources may be used when the vehicle is near the alerting zone. For example, more or less location data can correspond to more or less resources. As such, the safety system may experience limited efficiency, performance, and reliability. If the vehicle is not in the alerting zone, then less data may need to be shared (e.g., using less frequent transmissions). If the vehicle is in the alerting zone, then more data may need to be shared (e.g., more frequent transmission). In some embodiments, the location data is included in vehicle data for consumer vehicles, and in alerting vehicle data for alerting vehicles.

In accordance with an embodiment of the invention, a technique for vehicle data collection involves receiving, at a cloud computing system, vehicle data that indicates a location of a vehicle and a data reporting mode of the vehicle, determining, by the cloud computing system, whether the vehicle is located in an alerting zone using the vehicle data, determining, by the cloud computing system, if the data reporting mode of the vehicle needs to be changed based on the alerting zone determination, and generating, by the cloud computing system, a policy message for transmission to the vehicle when the data reporting mode needs to be changed, wherein the policy message indicates an updated data reporting mode of the vehicle.

By changing a data reporting mode of a vehicle based on a location of the vehicle relative to an alerting zone, data exchanged between the vehicle and a safety cloud over a wireless connection can be dynamically managed to preserve wireless bandwidth, conserve power, and reduce load on the safety cloud. For example, data reporting modes may have a set of configurations for providing vehicle data over a wireless connection that is based on whether a vehicle is located in an alerting zone or outside the alerting zone. When the vehicle is located in the alerting zone, it may be important to use a data reporting mode that enables more accurate data and/or more frequent reporting of the vehicle. Alternatively, when the vehicle is located outside the alerting zone, it may be possible to use a data reporting mode that enables conservation of energy and/or storage by reporting data less frequently. As such, changing a data reporting mode of a vehicle based on the vehicle's location can improve efficiency, performance, and reliability of safety systems. The enhancement in safety that comes with increased reporting is a worthwhile tradeoff when vehicles are in the alerting zone because the increased reporting may enable increased accuracy in vehicle localization. Alternatively, the conservation of resources outweighs enhancements in safety when the vehicles are outside the alerting zone because there may be less of a need for accurate vehicle localization.

An "alerting zone" may be described herein as a geographical area near a safety hazard (e.g., a construction zone, a car accident, a vehicle stopped along the side of the road, a lane closure, a road closure, etc.), near an alerting vehicle, near a route of the alerting vehicle, or any combination thereof. Examples of an alerting zone may include, but are not limited to, a geographical area that is within an X (X represents a positive value) mile radius of a safety hazard, a geographical area that covers a projected route of an alerting vehicle (plus X miles along each side of the route), or a geographical area that surrounds an alerting vehicle (by X miles) and that changes as the alerting vehicle changes locations (e.g., travels along a projected route). In some embodiments, the geographical area of the alerting zone may be defined by a set of geographical coordinates that are within a predetermined range set. In some embodiments, the geographical area may resemble a circle, an oval, a rectangle, a line, or other shape. In an embodiment, the alerting zone is determined by/in a safety cloud of a safety system. An example of a safety system is described in further detail with reference to FIG. 1.

FIG. 1 is a high-level overview of a safety system 100. The safety system 100 includes a safety cloud 102 that is connected to an alert tracking system 104 and to a vehicle tracking system 106. The safety cloud 102 may be implemented via software running on a computing system such as a remote server, a public cloud (e.g., Amazon Web Services (AWS), Google Cloud, Microsoft Azure, etc.), and/or a private cloud. In an embodiment, the safety cloud is implemented via a cloud computing system. The alert tracking system 104 and/or the vehicle tracking system 106 may be implemented via third-party computing systems, including for example, software running on a computing system such as a remote server, a public cloud, and/or a private cloud.

The alert tracking system 104 connects to one or more alerting vehicles (AVs), implemented as a AV1 108-1, AV2 108-2, and AVn 108-$n$ (n represents an integer greater than two), via, for example, a service provider wireless network or a private wireless network (e.g., 3G, 4G, 5G, etc.). AV1 108-1, AV2 108-2, and AVn 108-$n$ are connected to the alert tracking system 104 over a wireless connection via a first connection 105-1, a second connection 105-2, and an nth connection 105-$n$, respectively. Examples of the alerting vehicles include emergency vehicles (e.g., a police car, an ambulance, a firetruck, a military vehicle, or the like), safety vehicles (e.g., a construction vehicle, a towing vehicle, or the like), and/or other vehicles/devices that are capable of sending alerting vehicle data and/or connecting to the alert tracking system 104 over a wireless connection via the service provider network. The AVs 108-1, 108-2, and 108-$n$ may be included in an emergency vehicle fleet (e.g., a fleet of police cars corresponding to a police department, a fleet of firetrucks corresponding to a fire department, etc.). In an embodiment, the AVs 108-1, 108-2, and 108-$n$ are equipped with radios (e.g., a fixed radio and/or a mobile radio) to implement a wireless connection. Although an AV may commonly be a vehicle, the AV may also be a radio or other similar device capable of sending alerting (vehicle) data and/or of connecting to the alert tracking system 104.

In an embodiment, AV1 108-1, AV2 108-2, and AVn 108-$n$ send alerting vehicle data to the alert tracking system 104, such that the alerting vehicle data corresponds to AV1 108-1, AV2 108-2, and/or AVn 108-$n$. As an example, the alerting vehicle data may include an alert ID that corresponds to an alerting vehicle (e.g., AV1 108-1, AV2 108-2, or AVn 108-$n$) and alerting vehicle information that corresponds to the alerting vehicle. The alert ID may indicate whether emergency lights of an alerting vehicle are on/off, and the alerting vehicle information may indicate a location (e.g., longitude and latitude coordinates), a speed, and/or a direction of the alerting vehicle.

The vehicle tracking system 106 connects to one or more vehicles (V), implemented as a V1 110-1, V2 110-2, and Vn 110-$n$ (n represents an integer greater than two), via a service provider wireless network. V1 110-1, V2 110-2, and Vn 110-$n$ are connected over a wireless connection to the vehicle tracking system via a first connection 107-1, a second connection 107-2, and an nth connection 107-$n$, respectively. As described herein, a "vehicle" may refer to a consumer vehicle (e.g., a car, a motorcycle, or the like). The Vs 110-1, 110-2, and 110-$n$ may be included in a vehicle fleet (e.g., a fleet of cars owned by a company). In an embodiment, the Vs 110-1, 110-2, and 110-$n$ are equipped with radios (e.g., a fixed radio and/or a mobile radio) to implement a wireless connection. In an embodiment, V1 110-1, V2 110-2, and Vn 110-$n$ periodically send vehicle data to the vehicle tracking system 106 via the service provider network. As an example, the vehicle data may include a vehicle ID that corresponds to a vehicle (e.g., V1 110-1, V2 110-2, or Vn 110-$n$), location information (e.g., longitude and latitude coordinates) that corresponds to a location of the vehicle, and/or a data reporting mode ID that corresponds to a data reporting mode of the vehicle. Although V1 110-1, V2 110-2, and Vn 110-$n$ may commonly be vehicles, V1, V2, and/or Vn may also be a radio, a smartphone, or other similar device capable of sending (vehicle) data and/or of connecting to the vehicle tracking system 106.

In some embodiments, the safety cloud 102 receives the alerting vehicle data from AV1 108-1, AV2 108-2, and/or AVn 108-$n$ via the alert tracking system 104, and receives the vehicle data from V1 110-1, V2 110-2, and/or Vn 110-$n$ via the vehicle tracking system 106. The safety cloud 102 may use the alerting vehicle data to determine a geographical area of an alerting zone and a desired data reporting mode that is associated with the alerting zone. The safety cloud 102 may use the vehicle data to determine whether a vehicle is located in the alerting zone, and to determine whether a data reporting mode of the vehicle needs to be updated based on the alerting zone determination.

In an embodiment, if the data reporting mode of a vehicle does not need to be updated, then the safety cloud does not generate a policy message to trigger a change in the data reporting mode, and the safety cloud continues to receive the vehicle data. As an example, if a vehicle is located in the alerting zone and the data reporting mode of the vehicle is the same as the desired data reporting mode, then the safety cloud continues to receive vehicle data from the vehicle according to the current data reporting mode. As another example, if the vehicle is located outside the alerting zone and the data reporting mode of the vehicle is the same as the desired data reporting mode, then the safety cloud continues to receive vehicle data from the vehicle according to the current data reporting mode.

Alternatively, if the safety cloud determines that the data reporting mode of the vehicle needs to be changed, then the safety cloud generates a policy message that indicates the desired data reporting mode. As an example, if the vehicle is located in the alerting zone and the data reporting mode of the vehicle is different from the desired data reporting mode associated with the alerting zone, then a policy message is generated by the safety cloud and transmitted to the vehicle. In such an example, transmitting the policy message to the vehicle involves the safety cloud triggering a vehicle tracking system to send the policy message via a wireless connection. As another example, if the vehicle is located outside the alerting zone and the data reporting mode of the vehicle is different from the desired data reporting mode associated with the alerting zone, then the policy message is generated and sent to the vehicle via a wireless connection. In such examples, the policy message indicates the desired data reporting mode as the data reporting mode that should be immediately implemented.

Examples of how a data reporting mode is determined based on whether a vehicle is outside an alerting zone or in an alerting zone are described in further detail with reference to FIG. 2A and FIG. 2B, respectively.

Figure 2A:
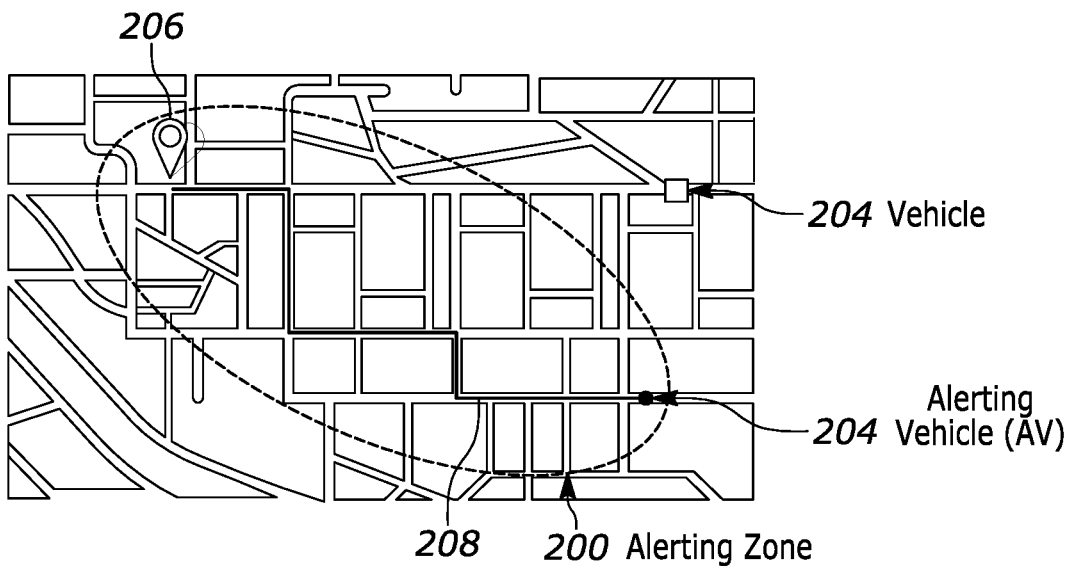
FIG. 2A depicts an example of a vehicle located outside an alerting zone.

FIG. 2A depicts an example of a vehicle 202 located outside an alerting zone 200. In the example illustrated by FIG. 2A, the alerting zone 200 is a geographical area that surrounds an alerting vehicle 204. In the example, the alerting zone 200 includes a destination 206 of the alerting vehicle 204 and a projected route 208 of the alerting vehicle to the destination. The destination 206 may be, for example, an emergency site (e.g., a car accident, a structure fire, a crime site, or the like), a safety hazard (e.g., a weather hazard, a road closure, a lane closure, a road obstruction, or the like), or other similar alert triggering destination. When the vehicle 202 is located outside the alerting zone 200, a data reporting mode of the vehicle may report data in a manner that requires less resources (e.g., less frequent transmission of vehicle data). For example, the data reporting mode of the vehicle 202 may be a conservation mode where vehicle data is sent according to a preset conservation mode configuration that involves less frequent wireless transmissions of vehicle data than a preset alert mode configuration. In such an example, the preset conservation mode configuration includes predefined vehicle data content, predefined transmission parameters, predefined network options, and predefined physical channel options which are described in further detail with reference to FIG. 8.

Figure 2B:
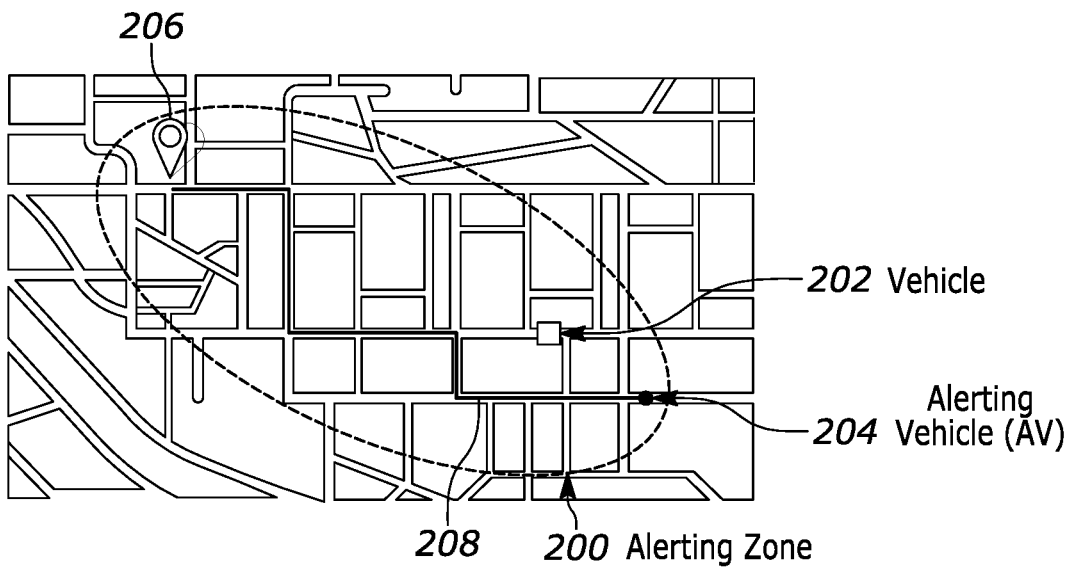
FIG. 2B depicts an example of a vehicle located in an alerting zone.

FIG. 2B depicts an example of the vehicle 202 located in the alerting zone 200. In the example shown by FIG. 2B, the alerting zone 200 includes the alerting vehicle 204, the projected route 208 of the alerting vehicle, and the destination 206 of the alerting vehicle as described with reference to FIG. 2A. In contrast to FIG. 2A, the vehicle 202 shown in FIG. 2B is located in the alerting zone 200. When the vehicle 202 is located in the alerting zone 200, a data reporting mode of the vehicle may report data in a manner that requires more resources (e.g., more frequent transmission of vehicle data). For example, the data reporting mode of the vehicle 202 may be an alert mode where vehicle data is sent over a wireless connection according to a preset alert mode configuration that involves more frequent wireless transmissions of vehicle data that a preset conservation mode configuration. In such an example, the preset conservation mode configuration includes predefined vehicle data content, predefined transmission parameters, predefined network options, and predefined physical channel options which are described in further detail with reference to FIG. 8.

Figure 3A:
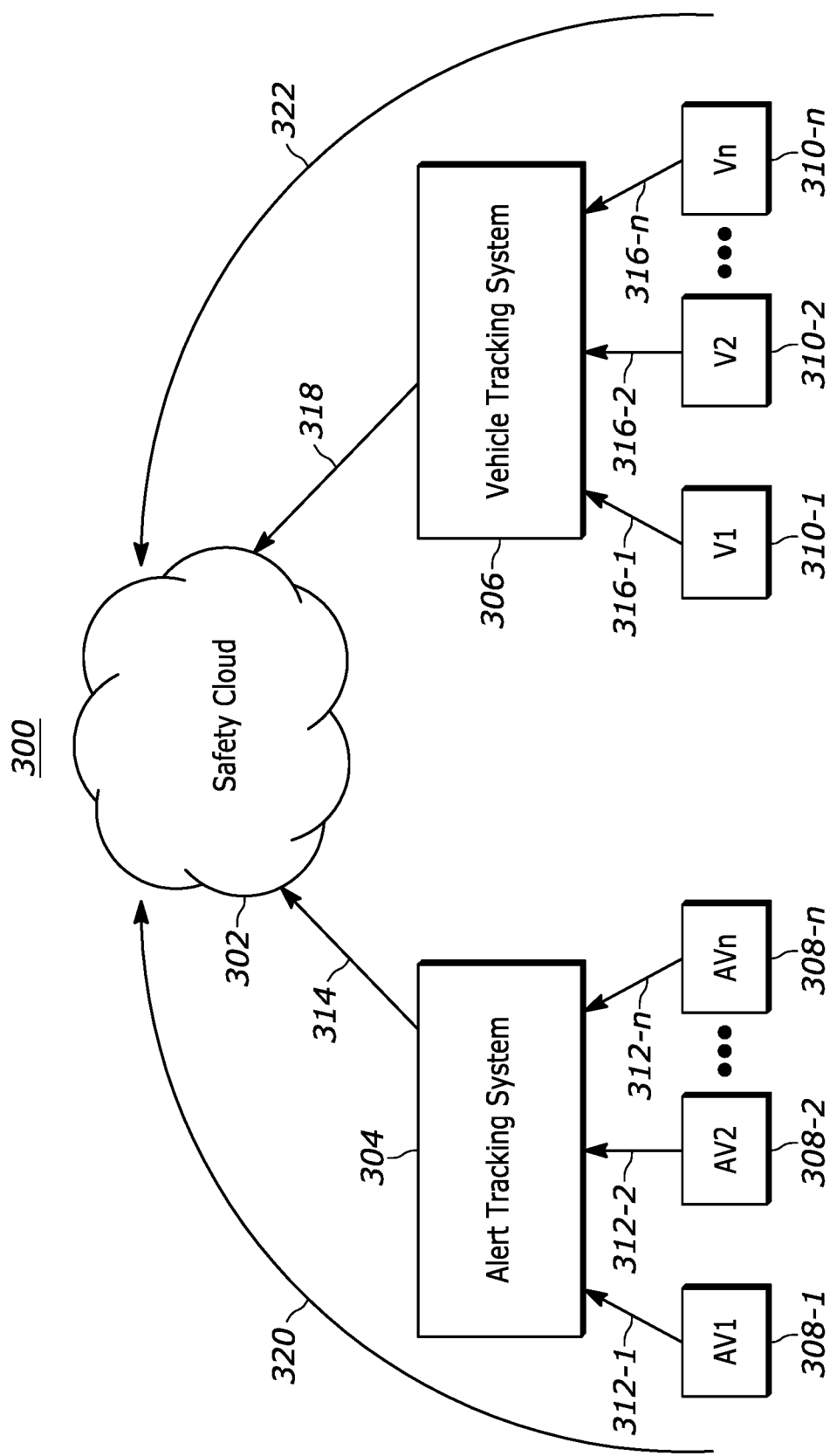
FIG. 3A illustrates the flow of data to a safety cloud.
Figure 3B:
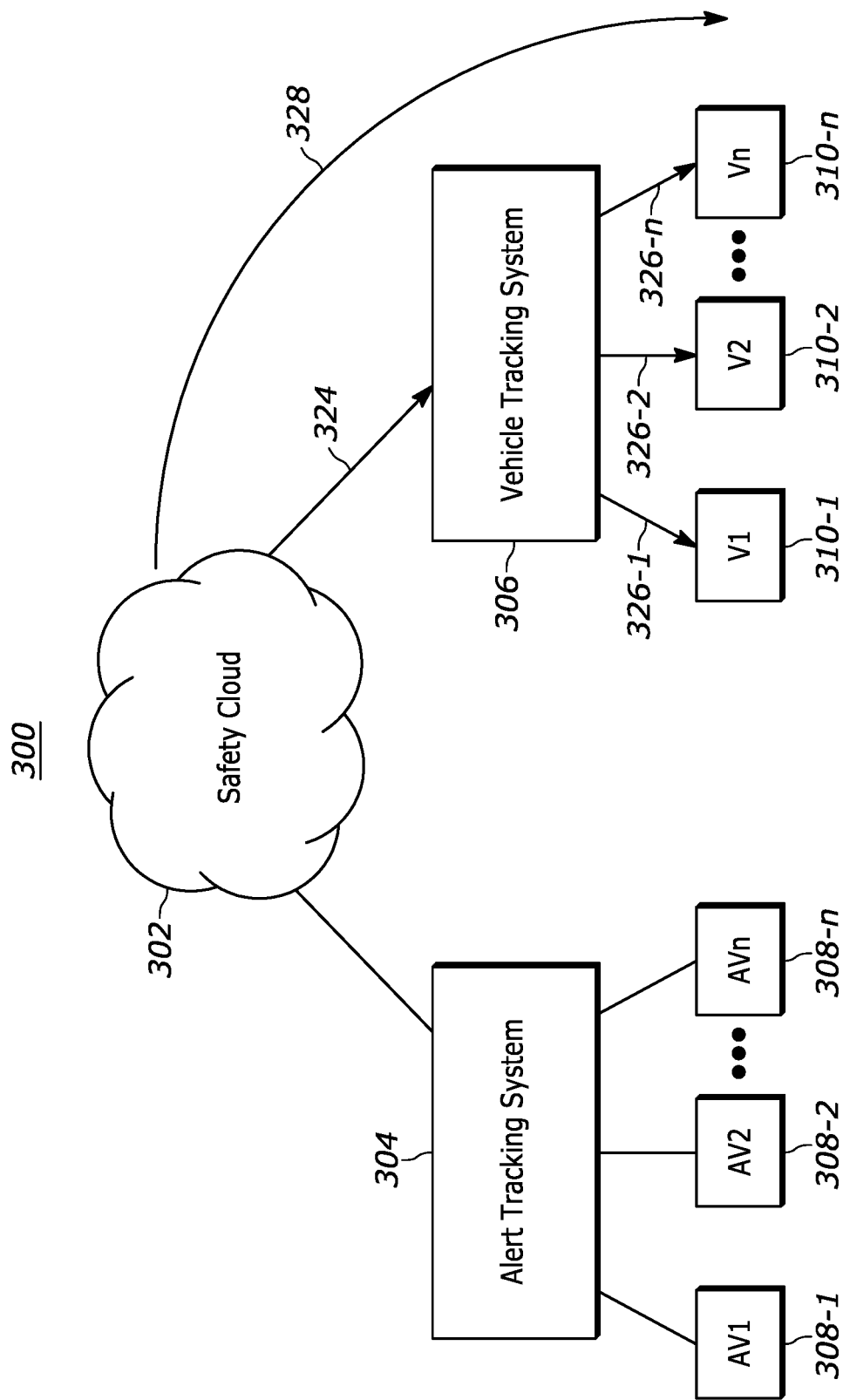
FIG. 3B illustrates the flow of data to vehicles.

Examples that illustrate the flow of data within a safety system are described herein with reference to FIG. 3A and FIG. 3B.

FIG. 3A illustrates the flow of data to a safety cloud. The flow of data to the safety cloud may represent a process for collecting data (e.g., from alerting vehicles and consumer vehicles). In particular, the example of FIG. 3A illustrates a safety system 300 that includes a safety cloud 302, an alert tracking system 304 that communicates with AV1 308-1, AV2 308-2, and/or AVn 308-n, and a vehicle tracking system 306 that communicates with V1 310-1, V2 310-2, and/or Vn 310-n as described with reference to FIG. 1. In contrast to FIG. 1, the example of FIG. 3A illustrates the flow of data to the safety cloud 302. In an embodiment, AV1 308-1, AV2 308-2, and/or AVn 308-n share alerting vehicle data with the alert tracking system 304 via wireless connections (represented by arrows 312-1, 312-2, and 312-n). The alert tracking system 304 then shares the alerting vehicle data with the safety cloud 302 (represented by arrow 314). In an embodiment, V1 310-1, V2 310-2, and/or Vn 310-n share vehicle data (not shown) with the vehicle tracking system 306 via wireless connections (represented by arrows 316-1, 316-2, and 316-n). The vehicle tracking system 306 then shares the vehicle data with the safety cloud 302 (represented by arrow 318).

In some embodiments, AV1 308-1, AV2 308-2, and/or AVn 308-n share alerting vehicle data directly with the safety cloud 302 (represented by arrow 320), and/or V1 310-1, V2 310-2, and/or Vn 310-n share vehicle data directly with the safety cloud 302 (represented by arrow 322). In such an embodiment, AV1 308-1, AV2 308-2, and/or AVn 308-n share alerting vehicle data directly with the safety cloud 302 by bypassing the alert tracking system 304, and V1 310-1, V2 310-2, and/or Vn 310-n share vehicle data directly with the safety cloud 302 by bypassing the vehicle tracking system 306.

Although the alert tracking system 304 is described as sharing alerting vehicle data from AV1 308-1, AV2 308-2, and/or AVn 308-n, the alert tracking system may also share data from other vehicles or devices (e.g., a roadside vehicle, a roadside sensor, a maintenance vehicle, a construction site device, etc.). Additionally, the alerting vehicle data may correspond to other alert-related data such as, for example, a weather hazard, a lane closure, a road obstruction, a construction site, traffic, etc. In some embodiments, other parties may have access to the alert tracking system 304, such that the other parties (e.g., construction teams, utility teams, weather tracking teams, etc.) may tap into the alert tracking system and input/send alert-related data to the safety cloud 302 to indicate a safety hazard and/or an alerting zone. In such an embodiment, the other parties may input alert-related data that includes a specific location (e.g., an address or longitude and latitude coordinates) and/or a zone to indicate the safety hazard and/or the alerting zone.

FIG. 3B illustrates the flow of data to vehicles. The flow of data to the vehicles may represent a process for updating/changing a data reporting mode of the vehicles. In particular, the example of FIG. 3B illustrates the safety system 300 that includes the safety cloud 302, the alert tracking system 304 that communicates with AV1 308-1, AV2 308-2, and/or AVn 308-n, and the vehicle tracking system 306 that communicates with V1 310-1, V2 310-2, and/or Vn 310-n as described with reference to FIG. 3A. In contrast to FIG. 3A, the example of FIG. 3B illustrates the flow of data to V1 310-1, V2 310-2, and/or Vn 310-n. The safety cloud 302 may generate a policy message for transmission to V1 310-1, V2 310-2, and/or Vn 310-n when the data reporting mode needs to be changed. In an embodiment, the safety cloud 302 sends the policy message to the vehicle tracking system 306 (represented by arrow 324). The vehicle tracking system 306 then sends the policy message to V1 310-1, V2 310-2, and/or Vn 310-*n* via wireless connections (represented by arrows 326-1, 326-2, and 326-*n*). In another embodiment, the safety cloud 302 sends the policy message directly to V1 310-1, V2 310-2, and/or Vn 310-*n* via a wireless connection (represented by arrow 328). In some embodiments, the same policy message is sent to all the vehicles included in the safety system 300. In some embodiments, the policy message is vehicle-specific, such that a different policy message is sent to each of the vehicles included in the safety system 300.

In an embodiment, a safety cloud may monitor a vehicle to ensure the vehicle is using a desired data reporting mode of an alerting zone. In such an embodiment, the safety cloud may use a certain technique when receiving vehicle data and determining whether to update a data reporting mode of the vehicle. In some embodiments, monitoring the vehicle, receiving the vehicle data, and determining whether to update the data reporting mode of the vehicle may be performed by the safety cloud in a timely manner that is fast to enough to help the vehicles avoid collisions with other vehicles (e.g., moving or stopped vehicles), safety hazards, and other events associated with an alerting zone. An example of a technique for vehicle data collection is described in further detail with reference to FIG. 4.

Figure 4:
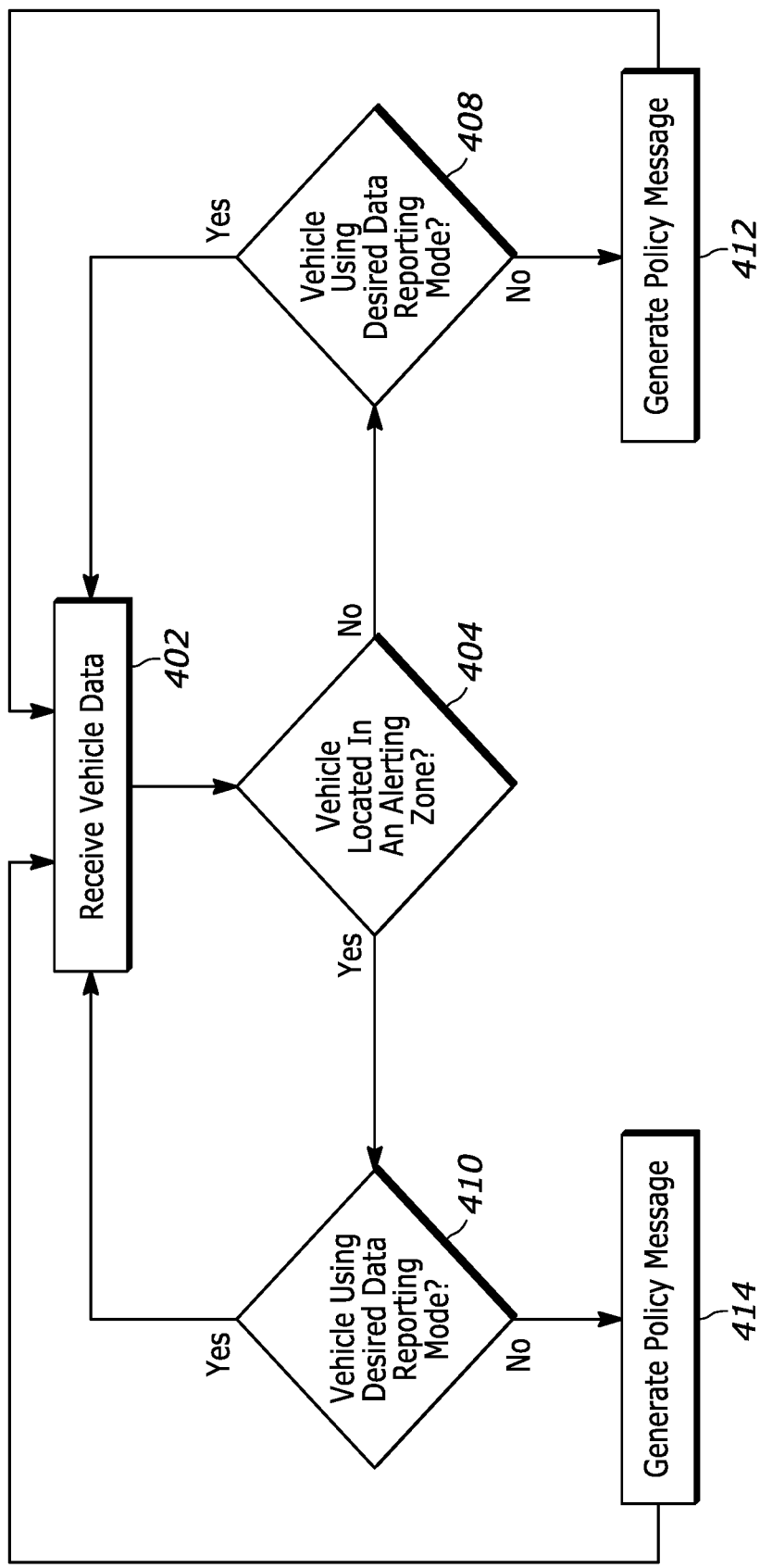
FIG. 4 depicts a flow diagram of a technique for vehicle data collection.

FIG. 4 depicts a flow diagram of a technique for vehicle data collection. The technique for vehicle data collection shown in FIG. 4 may be implemented by a safety cloud. In an embodiment, the technique for vehicle data collection may be implemented by safety cloud 102 in safety system 100 when communicating with alert tracking system 104, vehicle tracking system 106, AVs 108-1, 108-2, and 108-*n*, and Vs 110-1, 110-2, and 110-*n* (FIG. 1).

At block 402, the technique involves receiving vehicle data (e.g., from V1 110-1, V2 110-2, and/or Vn 110-*n*). In some embodiments, the vehicle data indicates a location of a vehicle and a data reporting mode of the vehicle. As an example, the vehicle data may be included in a vehicle data message that is sent by V1 110-1, V2 110-2, and/or Vn 110-*n* to vehicle tracking system 106 and/or safety cloud 102.

At decision point 404, the technique involves using the vehicle data to determine whether the vehicle is located in an alerting zone. Based on the alerting zone determination, the technique then involves determining if a data reporting mode of the vehicle needs to be changed at decision point 408 or at decision point 410.

If the vehicle is not located in the alerting zone (shown by "No"), i.e., the vehicle is located outside the alerting zone, then at decision point 408, the technique involves determining if the vehicle is using a desired data reporting mode. If the vehicle is using the desired data reporting mode (shown by "Yes"), i.e., the data reporting mode of the vehicle is the same as the desired data reporting mode, then the technique involves returning to block 402. If the vehicle is not using the desired data reporting mode (shown by "No"), i.e., the data reporting mode of the vehicle is different from the desired data reporting mode, then a policy message is generated at block 412. In an embodiment, the policy message is sent to the vehicle by the safety cloud and/or by the vehicle tracking system over a wireless connection. After the policy message is generated, the technique involves returning to block 402.

If the vehicle is located in the alerting zone (shown by "Yes"), then at decision point 410, the technique involves determining if the vehicle is using a desired data reporting mode. If the vehicle is using the desired data reporting mode (shown by "Yes"), i.e., the data reporting mode of the vehicle is the same as the desired data reporting mode, then the technique involves returning to block 402. If the vehicle is not using the desired data reporting mode (shown by "No"), i.e., the data reporting mode of the vehicle is different from the desired data reporting mode, then a policy message is generated at block 414. In an embodiment, the policy message is sent to the vehicle by the safety cloud and/or by the vehicle tracking system over a wireless connection. After the policy message is generated, the technique involves returning to block 402.

In some embodiments, determining whether the vehicle is located in the alerting zone, for example, decision point 404, includes receiving an alerting vehicle data message that includes alerting vehicle information that corresponds to an alerting vehicle (e.g., AV1 108-1, AV2 108-2, and/or AVn 108-*n*). As an example, the alerting vehicle information includes a location (e.g., longitude and latitude coordinates), a speed, and/or a direction of an alerting vehicle, and may also include a status (e.g., emergency lights on, siren, doing roadwork, etc.) that indicates whether the alerting vehicle is in a mode that needs an alerting zone. The safety cloud may then determine a geographical area of the alerting zone using the alerting vehicle information, and compare the location of the vehicle to the geographical area of the alerting zone. In some embodiments, determining if the data reporting mode of the vehicle needs to be changed, for example, at decision point 408 or at decision point 410, includes determining a desired data reporting mode associated with the alerting zone using the alerting vehicle information, and comparing the data reporting mode of the vehicle to the desired data reporting mode associated with the alerting zone. Examples of messages that may be sent and/or received in a safety system (e.g., safety system 100 (FIG. 1)) are described in further detail with reference to FIGS. 5-7.

Figure 5:
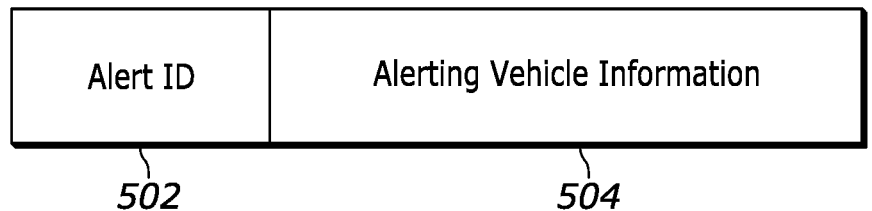
FIG. 5 depicts an example of an alerting vehicle data message generated by an alerting vehicle.

FIG. 5 depicts an example of an alerting vehicle data message 500 generated by an alerting vehicle. In particular, the alerting vehicle data message 500 shown in FIG. 5 includes two fields, implemented as an alert ID field 502 and an alerting vehicle information field 504. The alert ID field 502 may include an alert ID that corresponds to an alerting vehicle (e.g., AV1 108-1, AV2 108-2, and/or AVn 108-*n*), such that the alert ID may indicate whether the alerting vehicle has its emergency lights on/off. The alerting vehicle information field 504 may include alerting vehicle information that indicates a location, a speed, and/or a direction of the alerting vehicle. Although the alerting vehicle data message 500 is shown in FIG. 5 as including two fields, the alerting vehicle data message may have more than or less than two fields that indicate the same or different information. In an embodiment, the alerting vehicle data message 500 is sent by an alerting vehicle (e.g., AV1 108-1, AV2 108-2, and/or AVn 108-*n* (FIG. 1)) to an alert tracking system (e.g., alert tracking system 104 (FIG. 1)) via a first service provider network, and then shared with a safety cloud (e.g., safety cloud 102 (FIG. 1)) by the alert tracking system. In another embodiment, the alerting vehicle data message 500 is sent by the alerting vehicle to the safety cloud via the first service provider network.

Figure 6:
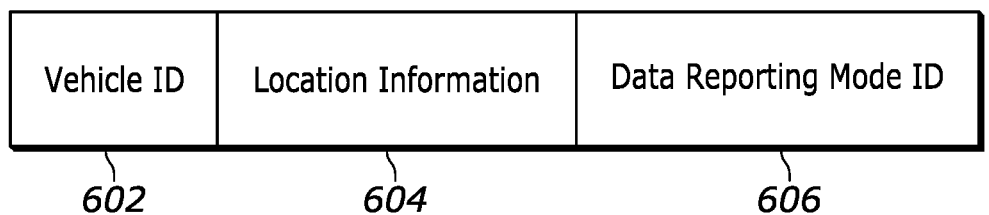
FIG. 6 depicts an example of a vehicle data message generated by a vehicle.

FIG. 6 depicts an example of a vehicle data message 600 generated by a vehicle. In particular, the vehicle data message 600 shown in FIG. 6 includes three fields, implemented as a vehicle ID field 602, a location information field 604, and a data reporting mode ID field 606. The vehicle ID field 602 may indicate a vehicle ID that corresponds to a vehicle (e.g., V1 110-1, V2 110-2, and/or Vn 110-*n*). The location information field 604 may indicate location information that corresponds a location of the vehicle. The location information field 604 may also indicate a speed and/or a direction of the vehicle. The data reporting mode ID field 606 may indicate a data reporting mode ID that corresponds to a data reporting mode of the vehicle. As an example, the data reporting mode of the vehicle may be indicated by a code that corresponds to the data reporting mode, a single bit (e.g., 0/1) that corresponds to the data reporting more, or a more complex indicator that corresponds to the data reporting mode.

Although the vehicle data message 600 is shown in FIG. 6 as including three fields, the vehicle data message may have more than or less than three fields that indicate the same or different information. In an embodiment, the vehicle data message 600 is sent by a vehicle (e.g., V1 110-1, V2 110-2, and/or Vn 110-n (FIG. 1)) to a vehicle tracking system (e.g., vehicle tracking system 106 (FIG. 1)) via a first service provider network, and then shared with a safety cloud (e.g., safety cloud 102 (FIG. 1)) by the vehicle tracking system. In another embodiment, the vehicle data message 600 is sent by the vehicle to the safety cloud via the first service provider network.

Figure 7:
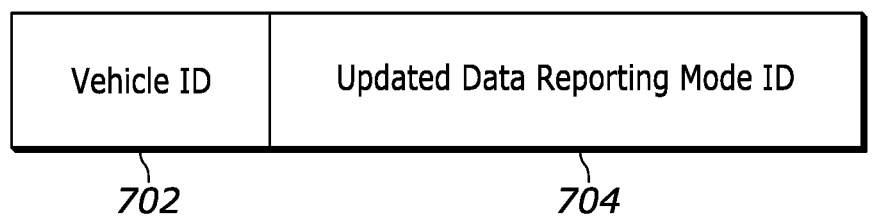
FIG. 7 depicts an example of a policy message generated by a safety cloud.

FIG. 7 depicts an example of a policy message 700 generated by a safety cloud (e.g., safety cloud 102 (FIG. 1)). In particular, the policy message 700 shown in FIG. 7 includes two fields, implemented as a vehicle ID field 702 and an updated data reporting mode ID field 704. The vehicle ID field 702 may indicate a vehicle ID that corresponds to a vehicle (e.g., V1 110-1, V2 110-2, and/or Vn 110-n (FIG. 1)), such that the vehicle ID is vehicle-specific. By using the vehicle ID, the policy message indicates which vehicle the policy message is intended for. Thus, the vehicle ID may improve the overall accuracy when updating the data reporting mode because the intended vehicle is more likely receive its updated data reporting mode. The updated data reporting mode ID field 704 may indicate an updated data reporting mode ID that corresponds to an updated data reporting mode for the vehicle. In an embodiment, the updated data reporting mode ID field 704 has a value of "fast" or "slow". Although the policy message 700 is shown in FIG. 7 as including two fields, the policy message may have more than or less than two fields that indicate the same or different information. In an embodiment, the policy message 700 is shared with a vehicle tracking system (e.g., vehicle tracking system 106 (FIG. 1)) by a safety cloud (e.g., safety cloud 102 (FIG. 1)), and then sent by the vehicle tracking system to a transceiver of a vehicle (e.g., V1 110-1, V2 110-2, and/or Vn 110-n (FIG. 1)) via a first service provider network. In another embodiment, the policy message 700 is sent by the safety cloud to the transceiver of the vehicle via the first service provider network. In yet another embodiment, the policy message 700 is sent by the safety cloud to a broadcasting tower near an alerting zone via the first service provider network, and then sent by the broadcasting tower to the transceiver of the vehicle via the second service provider network.

FIG. 8 is a table 800 that includes example parameters of data reporting modes. The table 800 includes parameters for an example "alert mode" and an example "conservation mode". Examples of the parameters include, but are not limited to, "frequency of transmissions", "content A (e.g., longitude/latitude)", "content B (e.g., speed and direction)", "physical channel options", and "network options (5G vs. 3/4G)". Although not shown, other parameters may include vehicle statistics such as, for example, steering column, braking, acceleration, etc.

In an embodiment, the parameters of the "alert mode" and the "conservation mode" represent a preset alert mode configuration and a preset conservation mode configuration, respectively. The preset alert mode configuration and the preset conservation mode configuration may include predefined vehicle data content, predefined transmission parameters, predefined network options, and predefined physical channel options. For example, the predefined vehicle data content includes "content A (e.g., longitude/latitude)" and/or "content B (e.g., speed and direction)", the predefined transmission parameters are defined by "frequency of transmissions", the predefined network options are defined by "network options (5G vs. 3/4G)", and the predefined physical channel options are defined by "physical channel options". The predefined vehicle data content may also include a reporting cadence in time, a reporting cadence in distance, alert geometry, a time to reset out of the "alert mode", etc.

In an embodiment, the preset alert mode configuration ("alert mode") includes parameters: 10 transmissions per minute, content A included (e.g., longitude/latitude), content B included (e.g., speed and direction), all available physical channel options, and 3G, 4G, or 5G. In an embodiment, the preset conservation mode configuration ("conservation mode") includes parameters: 2 transmissions per minute, content A included (e.g., longitude/latitude), content B not included (e.g., speed and direction), only energy efficient channel options, and 3G or 4G.

By using the alert mode, a more timely location of a vehicle may be determined. For example, changes in the vehicle's direction and/or speed can be identified more quickly. As such, a safety cloud (e.g., safety cloud 102 (FIG. 1)) can identify when the vehicle may be approaching an alerting zone, a safety hazard, and/or an emergency site, such as described with reference to the alerting zone 200 and the destination 206 of FIG. 2A, and can alert the vehicle accordingly.

By using the conservation mode, a vehicle may be able to conserve energy consumption and data storage. Using the conservation mode also allows the vehicle to conserve bandwidth, reduce congestion, and free up onboard resources and data transfer costs.

In some embodiments, the alert mode and/or the conservation mode may be a combination of parameters or one parameter. As an example, the alert mode may be defined by one parameter that indicates an alert mode vehicle data transmission frequency of one transmission per second. As another example, the conservation mode may be defined by one parameter that indicates a conservation mode vehicle data transmission frequency of one transmission per five seconds.

Figure 9:
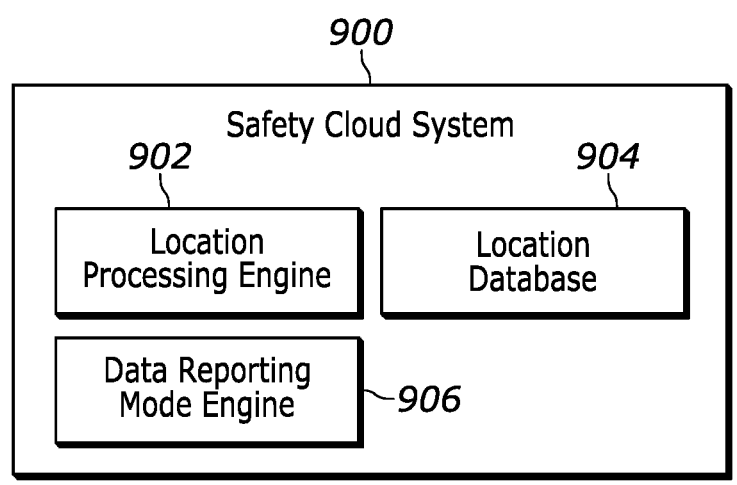
FIG. 9 is a high-level block diagram of a safety cloud system.

FIG. 9 is a high-level block diagram of a safety cloud system 900. The safety cloud system 900 may represent an embodiment of the safety cloud 102 shown in FIG. 1. In particular, the safety cloud system 900 includes a location processing engine 902, a location database 904, and a data reporting mode engine 906.

The location processing engine 902 may be configured to process alerting vehicle information from alerting vehicle data messages (e.g., alerting vehicle data message 500 (FIG. 5)) to determine a geographical area of an alerting zone. In an embodiment, the alerting vehicle information and the geographical area of the alerting zone are stored in the location database 904.

The location processing engine 902 may also be configured to process location information from a vehicle data message (e.g., vehicle data message 600 (FIG. 6)) to determine a location of a vehicle. To determine whether the vehicle is located in the alerting zone, the location processing engine 902 compares the location of the vehicle to the geographical area of the alerting zone that is stored in the location database 904.

The data reporting mode engine 906 may be configured to process alerting vehicle information from an alerting vehicle data message (e.g., alerting vehicle data message 500 (FIG. 5)) to determine a desired data reporting mode associated with the alerting zone. Additionally, the data reporting mode engine 906 may be configured to process a data reporting mode ID from the vehicle data message to determine a data reporting mode of the vehicle. To determine whether the data reporting mode of the vehicle needs to be updated, the data reporting mode engine 906 compares the data reporting mode of the vehicle to the desired data reporting mode associated with the alerting zone.

Figure 10:
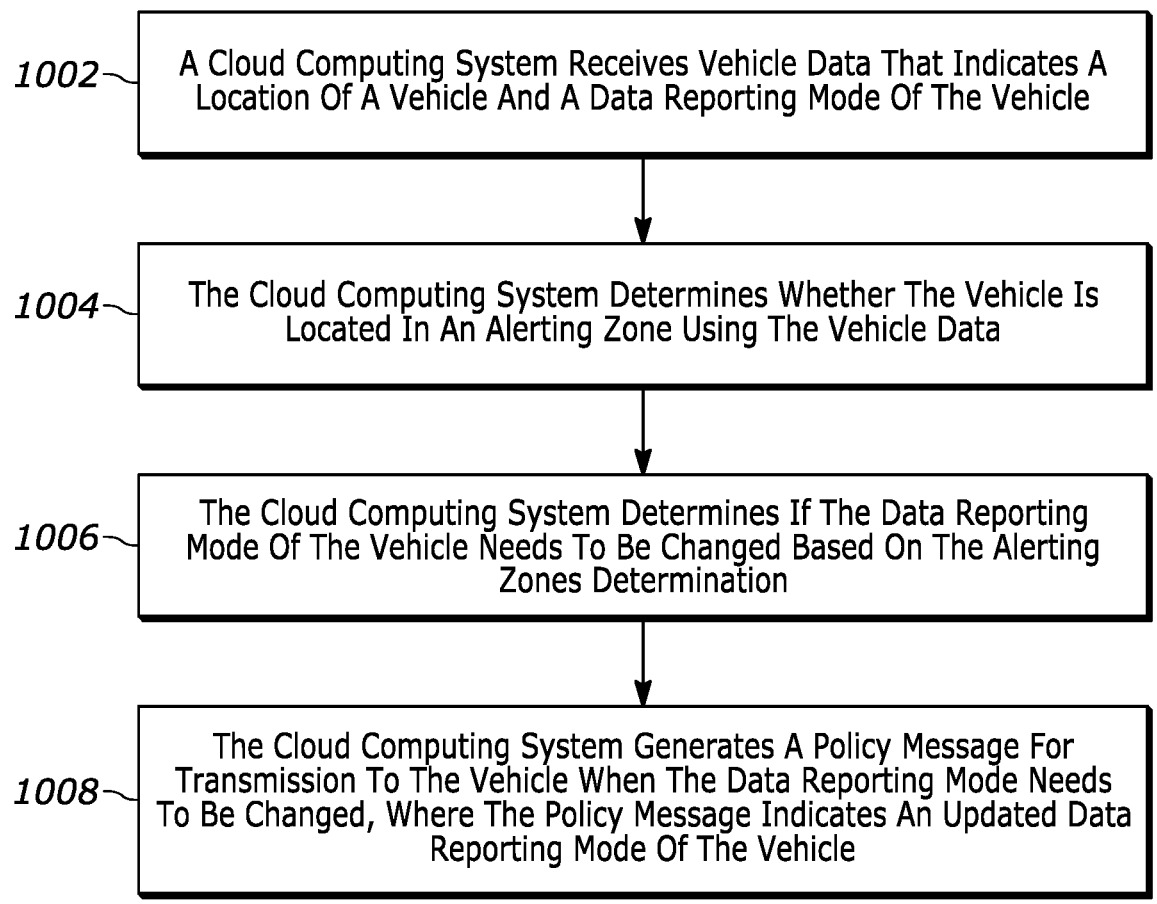
FIG. 10 illustrates a flow diagram of a technique for vehicle data collection in accordance with an embodiment of the invention.

FIG. 10 illustrates a flow diagram of a technique for vehicle data collection in accordance with an embodiment of the invention. At block 1002, a cloud computing system receives vehicle data that indicates a location of a vehicle and a data reporting mode of the vehicle. At block 1004, the cloud computing system determines whether the vehicle is located in an alerting zone using the vehicle data. At block 1006, the cloud computing system determines if the data reporting mode of the vehicle needs to be changed based on the alerting zone determination. At block 1008, the cloud computing system generates a policy message for transmission to the vehicle when the data reporting mode needs to be changed, where the policy message indicates an updated data reporting mode of the vehicle.

In some embodiments, the technique for vehicle data collection includes a non-transitory computer readable medium including instructions to be executed in a computer system. For example, the instructions when executed in the computer system perform a technique that includes receiving vehicle data that indicates a location of a vehicle and a data reporting mode of the vehicle, determining, using the vehicle data, whether the vehicle is located in an alerting zone, determining if the data reporting mode of the vehicle needs to be changed based on the alerting zone determination, and generating a policy message for transmission to the vehicle when the data reporting mode needs to be changed, where the policy message indicates an updated data reporting mode of the vehicle.

In some embodiments, the technique for vehicle data collection includes a non-transitory computer readable medium including instructions to be executed in a computer system. For example, the instructions when executed in the computer system perform a technique that includes sending vehicle data that indicates a location of a vehicle and a data reporting mode of the vehicle, receiving a policy message when the data reporting mode needs to be changed, where the policy message indicates an updated data reporting mode of the vehicle based on the location of the vehicle, and changing the data reporting mode of the vehicle according to the updated data reporting mode. In some embodiments, the computer system that executes the instructions for vehicle data collection may be a safety cloud (e.g., safety cloud 102 (FIG. 1)) or a safety cloud computing system.

Figure 11:
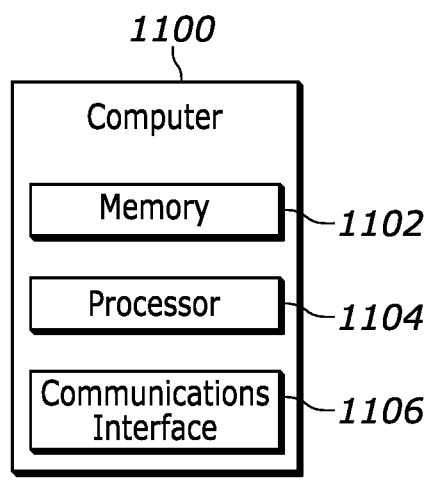
FIG. 11 depicts an example of a computer that can implement the technique for vehicle data collection as described with reference to FIG. 10.

In an embodiment, the above-described functionality is performed at least in part by a computer or computers, which executes computer readable instructions. FIG. 11 depicts an example of a computer that can implement the technique for vehicle data collection as described with reference to FIG. 10. As shown, the computer 1100 includes a memory 1102, a processor 1104, and a communications interface 1106. The processor may include a multifunction processor and/or an application-specific processor. As an example, the processor could be a central processing unit (CPU) (with software), an application-specific integrated circuit (ASIC), a transceiver, a radio, or a combination thereof. The memory within the computer may include, for example, storage medium such as read only memory (ROM), flash memory, random access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 1100 may represent a safety cloud (e.g., safety cloud 102 (FIG. 1)) or a safety cloud computing system. As another example, the computer 1100 may represent a transceiver and/or a receiver of a device (e.g., a transceiver and/or a receiver of V1 110-1 and/or AV1 108-1 (FIG. 1)) or of a system (e.g., vehicle tracking system 106 and/or alert tracking system 104 (FIG. 1)). In such an example, the computer includes a non-transitory computer readable medium comprising instructions to be executed in a computer system. As an example, the computer system may include or connect to antennas, processors, batteries, storage mediums, etc., and may be configured to perform wireless operations and/or communications.

In a cloud-based safety system as described above with reference to FIGS. 1-11, it may be desirable to alert vehicles within an alerting zone when a vehicle has its hazard lights on, as activation of hazard lights is often an indication of a hazardous situation on a road. However, the hazard lights of a vehicle can be manually turned on at any time and the degree of hazard may vary widely for each instance. For example, it is often the case that a vehicle's hazard lights are turned on when the vehicle is stopped on a local road (e.g., with a 25 mph speed limit) to load/unload a passenger, which may correspond to a less hazardous condition than when a vehicle is stranded on the side of a busy freeway (e.g., with a 70 mph speed limit).

In a cloud-based safety system that sends alert messages to vehicles, too many alert messages being presented to a driver can have negative consequences, such as reduced driver awareness of the alert messages. Consequently, it has been realized that alert messages triggered by the activation of hazard lights can be limited by a cloud-based safety system to instances in which the vehicle's hazard lights are on and a preexisting functional classification of the road is a functional classification that tends to correspond to more hazardous situations. For example, if the hazard lights of a vehicle are turned on and the vehicle is on a road that has a functional classification of FC1-FC3, then an alert messaging operation is initiated by the cloud-based safety system, however, if the hazard lights of the vehicle are turned on and the vehicle is on a road having a functional classification of FC4-FC7, then the alert messaging operation will not be initiated by the cloud-based safety system. Through implementation of such an alerting protocol, alert messages are sent by the cloud-based safety system under conditions that are deemed to be more hazardous than other situations. Thus, vehicle operators may be presented with fewer alerts, thereby improving their awareness of the alerts that are presented to the vehicle operators.

As described above, the decision of whether or not to initiate an alert messaging operation is made by the cloud-based safety system in response to the preexisting functional classification of the road that corresponds to the vehicle that notified the cloud-based safety system that its hazard lights are on. The United States Federal Highway Administration (FHWA) Functional Classification System is used to categorize roads and highways across the United States based on their primary function within the transportation network. This classification system is crucial for effective transportation planning, road design, and infrastructure management. The system is used to assign each road a functional classification code (FC code) that reflects the intended purpose and role of the road in the broader road network. The functional classifications that are assigned to roads are considered as the preexisting functional classifications for purposes of alert messaging. There are seven main functional classifications within this system:

Interstate (FC1): These are the highest-capacity roads, designed for high-speed, uninterrupted travel over long distances. Interstates provide direct connections between major cities and regions. These roads often have limited access points and are designed to accommodate significant traffic volumes.

Other Freeways or Expressways (FC2): Roadways in this functional classification category look very similar to Interstates. While there can be regional differences in the use of the terms 'freeway' and 'expressway', for the purpose of functional classification the roads in this classification have directional travel lanes, are usually separated by some type of physical barrier, and their access and egress points are limited to on- and off-ramp locations or a very limited number of at-grade intersections. Like Interstates, these roadways are designed and constructed to maximize their mobility function, and abutting land uses are not directly served by them.

Other Principal Arterial (FC3): These roads also serve major corridors and connect important urban and rural areas. While these roads may have more access points than freeways, they still carry significant traffic volumes and facilitate efficient regional travel.

Minor Arterial (FC4): Minor arterials connect smaller cities, towns, and important centers. These roads provide medium-distance travel options and help distribute traffic from major arterials to local roads.

Major Collector (FC5): Major collectors gather and distribute traffic within communities and neighborhoods. These roads play a role in linking local streets to higher-class roads, aiding in both local and regional travel.

Minor Collector (FC6): Similar to major collectors, minor collectors facilitate local traffic movement, connecting residential areas, commercial zones, and smaller centers to higher-class roads.

Local (FC7): Local roads primarily provide access to individual properties, residences, and businesses. These roads serve short-distance travel needs and have the lowest traffic volume capacity.

Each of these functional classifications (FCs) represents a different type of road, with specific design criteria, traffic handling capabilities, and roles within the transportation network. The FHWA Functional Classification System allows transportation agencies to allocate resources, plan road improvements, and manage infrastructure in a way that aligns with the distinct needs of various road types and their respective roles in the broader transportation system. The functional classifications of roads may be embedded into digital maps, including digital maps that are publicly available, such as for example, Google Maps, Apple Maps, OpenStreetMap (OSM). Functional classifications of roads may be maintained in other digital maps including proprietary maps and/or government maintained maps. Other governing bodies may use similar roadway functional classification systems, which may be incorporated into the alert messaging techniques disclosed herein.

FIG. 12 is an example decision chart 1200 that shows functional classifications of roads and corresponding alert messaging rules. As shown in FIG. 12, the decision chart includes a column of functional classification names, a column of functional codes, and a column of alerting rules, which are to be implemented by the cloud-based safety system when the hazard lights of a vehicle are on (e.g., the hazard lights are turned on, activated, etc.). As shown in the decision chart, if the functional classification of a road that corresponds to a vehicle is "Interstate" and/or the FC code is FC1, then alerting is initiated when the hazard lights of the vehicle are on, if the functional classification of a road that corresponds to a vehicle is "Other Freeways or Expressways" and/or the FC code is FC2, then alerting is initiated when the hazard lights of the vehicle are on, and if the functional classification of a road that corresponds to a vehicle is "Other Principal Arterial" and/or the FC code is FC3, then alerting is initiated when the hazard lights of the vehicle are on. However, if the functional classification of a road that corresponds to a vehicle is "Minor Arterial" and/or the FC code is FC4, then alerting is not initiated when the hazard lights of the vehicle are on, if the functional classification of a road that corresponds to a vehicle is "Major Collector" and/or the FC code is FC5, then alerting is not initiated when the hazard lights of the vehicle are on, if the functional classification of a road that corresponds to a vehicle is "Minor Collector" and/or the FC code is FC6, then alerting is not initiated when the hazard lights of the vehicle are on, and if the functional classification of a road that corresponds to a vehicle is "Local" and/or the FC code is FC7, then alerting is not initiated when the hazard lights of the vehicle are on.

As illustrated in the decision chart 1200 of FIG. 12 when a vehicle's hazard lights are on and the vehicle's location corresponds to a roadway in a first set of functional classes, FC1-FC3, then an alert messaging operation is initiated by the cloud-based safety system, however, when the vehicle's hazard lights are on but the vehicle's location corresponds to a roadway in a second set of functional classes, FC4-FC7, then an alert messaging operation is not initiated by the cloud-based safety system. Although FIG. 12 illustrates an example of a decision chart for implementing alert messaging, other examples are possible. For example, the set of functional classes that trigger an alert may be adjusted to include more or fewer functional classes. In the example of FIG. 12, the relative hazard corresponding to roads classified as FC1-FC3 has been deemed to be high enough to warrant alert messaging when a vehicle on such a road has its hazard lights on, while the relative hazard corresponding to roads classified as FC4-FC7 has been deemed to be low enough to warrant forgoing alert messaging when a vehicle on such a road has its hazard lights on. Regardless of the demarcation line between alerting and not alerting, it has been found that logic which leverages preexisting functional classifications of roads on which vehicles are located combined with knowledge that a particular vehicle's hazard lights are on can be used by a cloud-based safety system to automatically make decisions on alerting that can result in alerts being selectively presented to drivers in a way that improves safety outcomes by reducing and/or avoiding alert message fatigue that may result from drivers being bombarded by too many alert messages, rendering the alert messages ineffective. Further, the improved safety outcomes can be achieved at scale in an automated cloud-based safety system across a wide geographic area without having to manually classify the relative safety hazards of road by leveraging the functional classifications of roads that already exists.

Figures 13, 14:
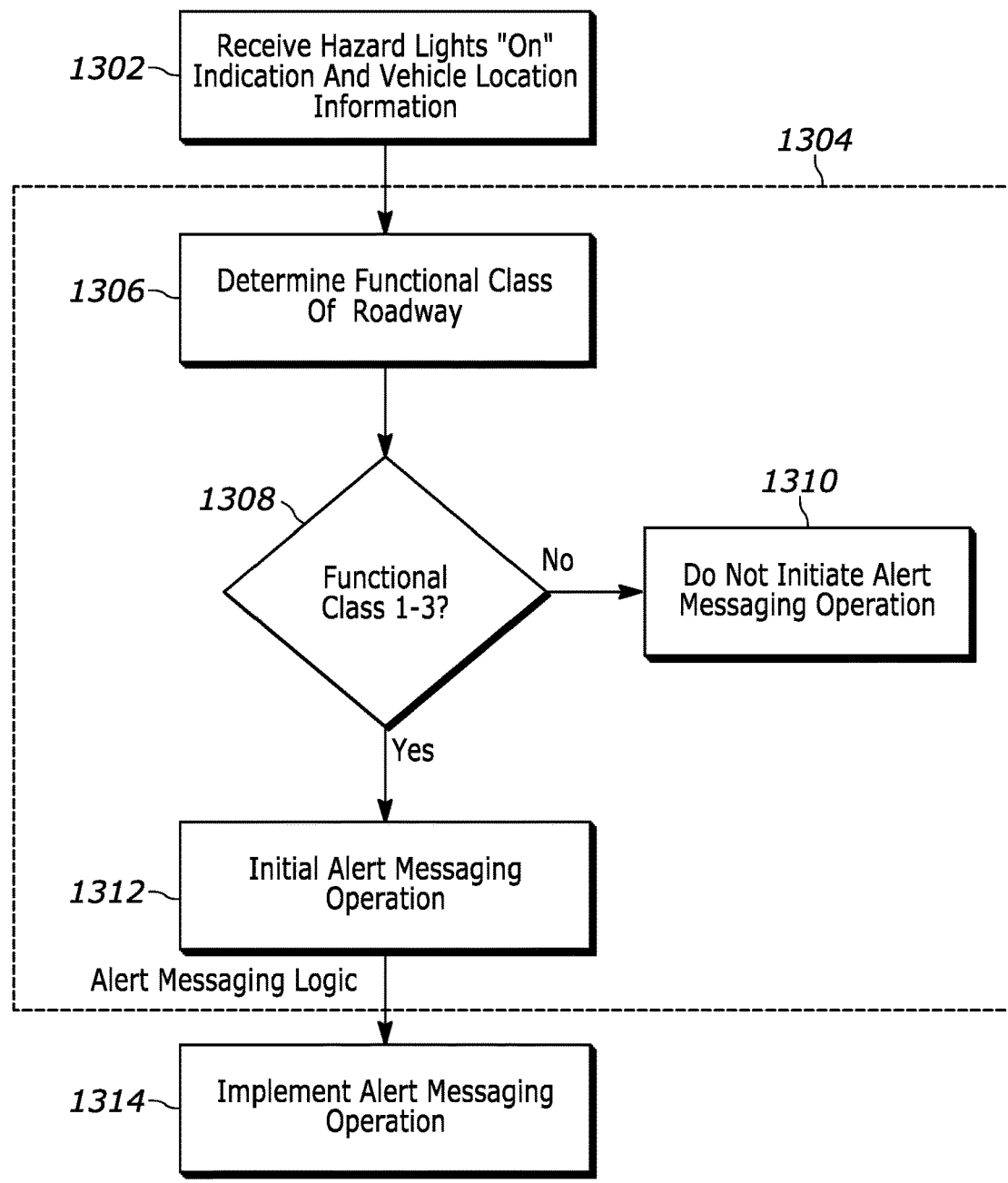
FIG. 13 is a process flow diagram of an example method for alerting vehicles that can be implemented by a cloud-based safety system.
FIG. 14 depicts an example of a vehicle data message generated by a vehicle.

FIG. 13 is a process flow diagram of an example method for alerting vehicles that can be implemented in an automated manner by a cloud-based safety system. At block 1302, the cloud-based safety system receives digital data that includes vehicle data that indicates a location of a vehicle and an indication that the vehicle's hazard lights are on. Upon receipt of such information, the cloud-based safety system implements alert messaging logic 1304. At block 1306, the functional classification of the roadway that corresponds to the vehicle is determined. For example, in a reverse geocoding operation, vehicle location information (e.g., longitude and latitude) is compared to a map to determine a roadway that corresponds to the vehicle. For example, the vehicle location information (e.g., longitude and latitude) is compared to a roadway map, which includes functional classes of the roads, to determine the roadway and functional classification of the road on which the vehicle is located. In an example, vehicle location information (e.g., longitude and latitude coordinates) is provided through an Application Programming Interface (API) to a mapping service that is remote to the cloud-based safety system. The mapping service uses the location information to find a corresponding roadway (e.g., the closest roadway or road segment) and a corresponding attribute of the roadway, which is the functional classification of the roadway. The mapping service returns roadway information (e.g., the roadway name) and the functional classification of the roadway. In another example, the cloud-based safety system may host a mapping service that is able to determine roadways and corresponding roadway functional classifications from location information (e.g., longitude and latitude coordinates).

Once the functional classification of the roadway has been determined, at decision point 1308, it is determined whether or not the functional classification is within a particular set of functional classes, e.g., the set of FC1-FC3. If the functional classification of the road is not within the set of functional classes, e.g., FC1-FC3, then at block 1310 an alert messaging operation is not initiated by the cloud-based safety system. However, if the functional class is within the set of functional classes, e.g., FC1-FC3, then at block 1312 an alert messaging operation is initiated by the cloud-based safety system. In this way, the alert messaging logic selects between the available options of 1) initiating an alert messaging operation (e.g., block 1312), and 2) not initiating an alert messaging operation (e.g., block 1310) in response to the functional classification of the road. Next, at block 1314, the alert messaging operation is implemented by the cloud-based safety system. For example, implementing the alert messaging operation may involve sending alert messages within an alerting zone around the location of the vehicle that has its hazard lights on. As described with reference to FIG. 13, the technique for alerting vehicles, which can be implemented by the cloud-based safety system, involves receiving, at a cloud computing system, digital data that includes a location of a vehicle and a hazard lights on status of the vehicle, determining, by the cloud computing system, a functional classification of a road that corresponds to the location of the vehicle, wherein the digital data is received from the vehicle via a wireless connection, and determining, by the cloud computing system, whether to initiate an alert messaging operation in response to the functional classification of the road and the hazard lights on status, wherein determining whether to initiate the alert messaging operation involves selecting from available options of: 1) initiating the alert messaging operation when the functional classification of the road is determined to be within a first set of functional classifications, and 2) not initiating the alert messaging operation when the functional classification of the road is determined to be within a second set of functional classifications.

FIG. 14 depicts an example of a vehicle data message 1400 generated by a vehicle. In particular, the vehicle data message 1400 shown in FIG. 14 includes three fields, implemented as a vehicle ID field 1402, a location information field 1404, and a hazard lights status field 1406. The vehicle ID field 1402 may indicate a vehicle ID that corresponds to a vehicle (e.g., V1 1510-1, V2 1510-2, and/or Vn 1510-$n$). The location information field 1404 may indicate location information (e.g., longitude/latitude coordinates of the vehicle) that corresponds a location of the vehicle. The location information field 1404 may also indicate a speed and/or a direction of the vehicle. The hazard lights status field 1406 may indicate a status of the vehicle's hazard lights. For example, the hazard lights status field may be a 1-bit field in which "0" indicates that the hazard lights of the vehicle are not on (i.e., the hazard lights of the vehicle are off), and in which a "1" indicates that the hazard lights of the vehicle are on, e.g., where the "1" is a hazard lights on code. In other embodiments, the hazard lights status may be indicated in another way via a vehicle data message. In an example, a vehicle data message (e.g., a hazards lights on code) is automatically generated and wirelessly transmitted from the vehicle when the vehicle's hazard lights are turned on. In another example, each vehicle data message includes a hazard lights status field that indicates the current hazard lights status of the vehicle. Although the vehicle data message 1400 is shown in FIG. 14 as including three fields, the vehicle data message may have more than or less than three fields that indicate the same or different information. In an embodiment, the vehicle data message 1400 is sent (e.g., wirelessly transmitted) by a vehicle (e.g., V1 110-1, V2 110-2, and/or Vn 110-$n$ (FIG. 1)) to a vehicle tracking system (e.g., vehicle tracking system 106 (FIG. 1)) via a first service provider network, and then shared with a safety cloud (e.g., safety cloud 102 (FIG. 1)) by the vehicle tracking system. In another embodiment, the vehicle data message 1400 is sent by the vehicle to the safety cloud via the first service provider network.

Figure 15A:
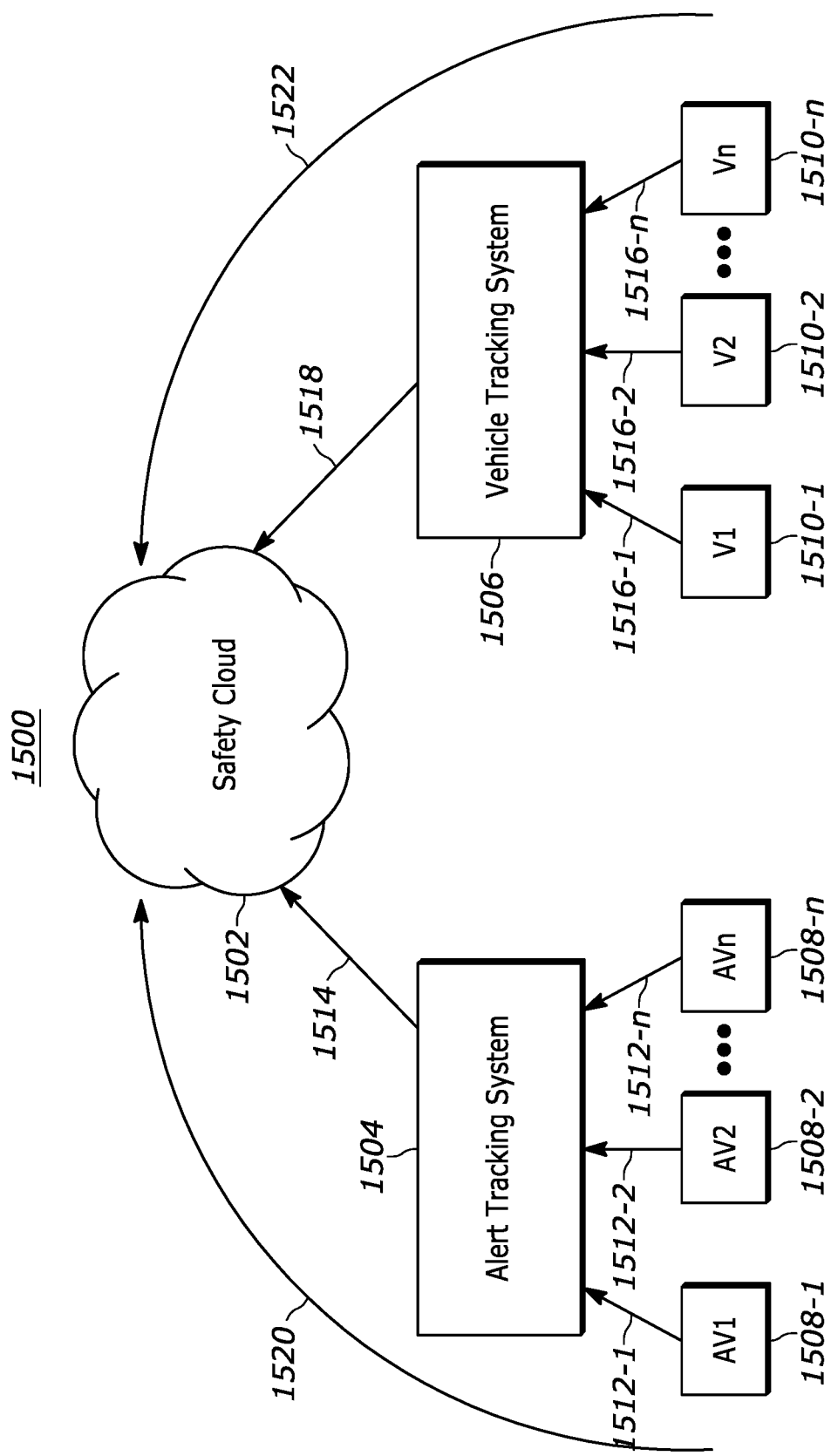
FIG. 15A illustrates the flow of data from vehicles.

An example of alert messaging based on the status of a vehicle's hazard lights and a functional classification of a road is further described with reference to FIGS. 15A and 15B. FIG. 15A illustrates one or more vehicles providing location information and hazard lights status information to the cloud-based safety system. In particular, FIG. 15A illustrates the flow of data to a safety cloud such as a cloud-based safety system. The flow of data to the safety cloud may represent a process for collecting data (e.g., from alerting vehicles and consumer vehicles). In particular, the example of FIG. 15A illustrates a safety system 1500 that includes a safety cloud 1502, an alert tracking system 1504 that communicates with AV1 1508-1, AV2 1508-2, and/or AVn 1508-$n$, and a vehicle tracking system 306 that communicates with V1 310-1, V2 1510-2, and/or Vn 1510-$n$ as described with reference to FIG. 1. In contrast to FIG. 1, the example of FIG. 15A illustrates the flow of data to the safety cloud 1502. In an embodiment, AV1 1508-1, AV2 1508-2, and/or AVn 1508-$n$ share vehicle data (e.g., location information and hazard lights status) with the alert tracking system 1504 via wireless connections (represented by arrows 1512-1, 1512-2, and 1512-$n$). The alert tracking system 1504 then shares the alerting vehicle data with the safety cloud 1502 (represented by arrow 1514). In an embodiment, V1 1510-1, V2 1510-2, and/or Vn 1510-$n$ share vehicle data (e.g., location information and hazard lights status) with the vehicle tracking system 1506 via wireless connections (represented by arrows 1516-1, 1516-2, and 1516-n). The vehicle tracking system 1506 then shares the vehicle data with the safety cloud 1502 (represented by arrow 1518).

In some embodiments, AV1 1508-1, AV2 1508-2, and/or AVn 1508-n share vehicle data (e.g., location information and hazard lights status) directly with the safety cloud 1502 (represented by arrow 1520), and/or V1 1510-1, V2 1510-2, and/or Vn 1510-n share vehicle data (e.g., location information and hazard lights status) directly with the safety cloud 1502 (represented by arrow 1522). In such an embodiment, AV1 1508-1, AV2 1508-2, and/or AVn 1508-n share vehicle data directly with the safety cloud 1502 by bypassing the alert tracking system 1504, and V1 1510-1, V2 1510-2, and/or Vn 1510-n share vehicle data directly with the safety cloud 1502 by bypassing the vehicle tracking system 1506.

Figure 15B:
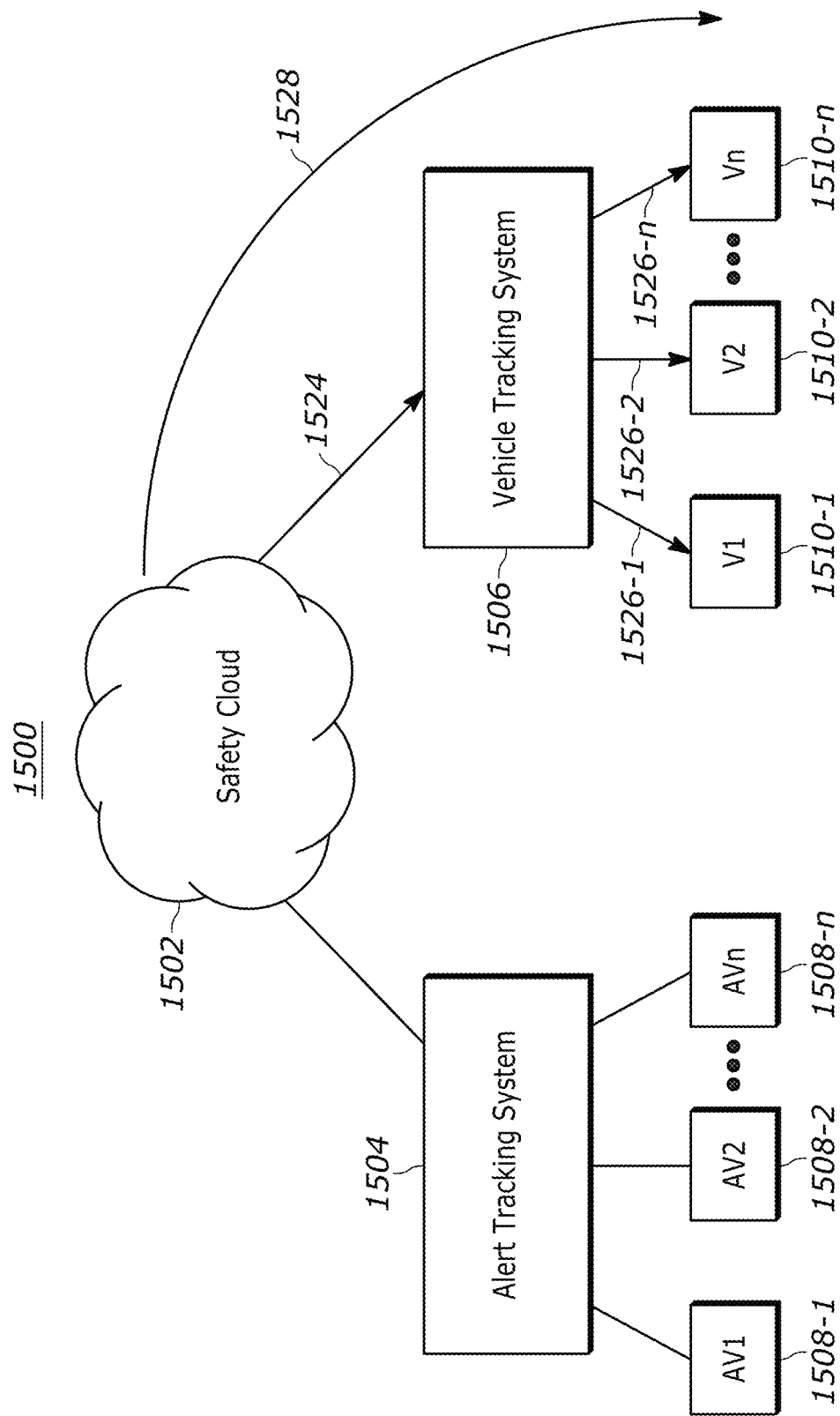
FIG. 15B illustrates the flow of data to vehicles.

FIG. 15B illustrates the flow of data to vehicles. The flow of data to the vehicles may represent a process for sending alert messages to vehicles. In particular, the example of FIG. 15B illustrates the safety system 1500 that includes the safety cloud 1502, the alert tracking system 1504 that communicates with AV1 1508-1, AV2 1508-2, and/or AVn 1508-n, and the vehicle tracking system 1506 that communicates with V1 1510-1, V2 1510-2, and/or Vn 1510-n as described with reference to FIG. 15A. In contrast to FIG. 15A, the example of FIG. 15B illustrates the flow of data to V1 1510-1, V2 1510-2, and/or Vn 1510-n. For example, the safety cloud 1502 may generate an alert message for transmission to V1 1510-1, V2 1510-2, and/or Vn 1510-n when a vehicle has turned on its hazard lights and the vehicle is on a roadway with a functional classification of FC1-FC3. In an embodiment, the safety cloud 1502 sends the alert message to the vehicle tracking system 1506 (represented by arrow 1524). The vehicle tracking system 1506 then sends the alert message to V1 1510-1, V2 1510-2, and/or Vn 1510-n via wireless connections (represented by arrows 1526-1, 1526-2, and 1526-n). In another embodiment, the safety cloud 1502 sends the alert message directly to V1 1510-1, V2 1510-2, and/or Vn 1510-n via a wireless connection (represented by arrow 1528). In some embodiments, the same alert message is sent to all the vehicles in an alerting zone of the safety system 1500. For example, although not illustrated in FIG. 15B, the alert message may be sent to and/or received by the alerting vehicles, AV1 1508-1, AV2 1508-2, and/or AVn 1508-n that are in the alerting zone. In some embodiments, the alert message is vehicle-specific, such that a different alert message is sent to each of the vehicles included in the safety system 1500. The cloud-based safety system may implement alert messaging logic as, for example, described above with reference to FIGS. 12 and 13.

Figure 16:
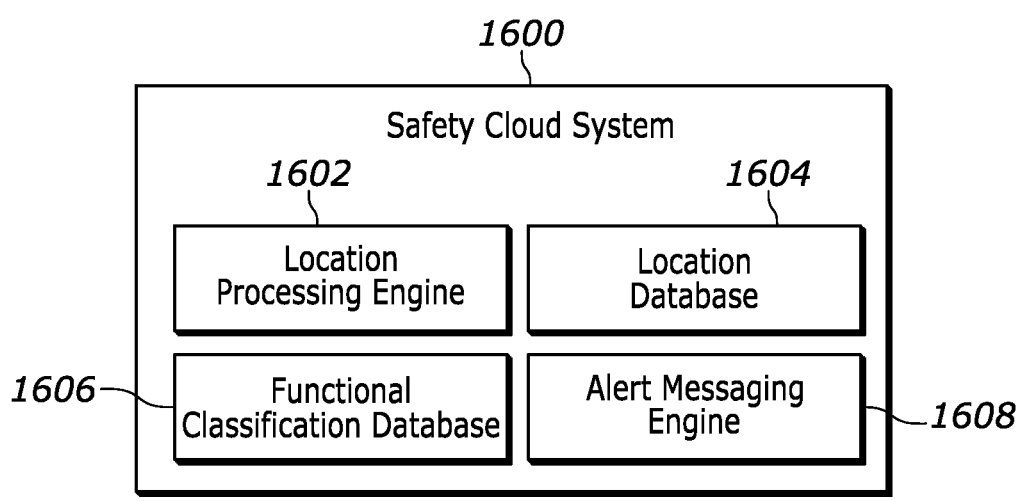
FIG. 16 is a high-level block diagram of a cloud-based safety system.

FIG. 16 is a high-level block diagram of a cloud-based safety system, referred to as safety cloud system 1600. The safety cloud system 1600 may represent an embodiment of the safety cloud 102 shown in FIG. 1 and/or the safety cloud system 1600 may be implemented in a cloud-based safety system. In the example of FIG. 16, the safety cloud system 1600 includes a location processing engine 1602, a location database 1604, a functional classification database 1606, and an alert messaging engine 1608. The safety cloud system may be implemented in software, in hardware, or in some combination of software and hardware.

The location processing engine 1602 may be configured to process vehicle information from vehicle data messages (e.g., vehicle data message 1400 (FIG. 14)) to determine the locations of vehicles and/or a geographical area of an alerting zone. In an embodiment, the vehicle location information and the geographical area of the alerting zone are stored in the location database 1604.

The location database 1604 may store information regarding the location of alerting vehicles, AV1 1508-1, AV2 1508-2, and/or AVn 1508-n and/or consumer vehicles, V1 1510-1, V2 1510-2, and/or Vn 1510-n. For example, the location database may store a database of vehicle ID information and corresponding vehicle location information.

The functional classification database 1606 may store information related to the functional classifications of roads. In an example, the functional classification database stores digital mapping information that includes longitude and latitude information, road information, address information, and functional classification information. The information is stored in a manner that enables reverse geocoding. In the example of FIG. 16, the functional classification database is local to the cloud system. However, in other embodiments, the functional classification database is a remote mapping service that is accessed using APIs.

The alert messaging engine 1608 may implement alert messaging logic as described with reference to FIGS. 12 and 13. For example, the alert messaging engine may determine whether or not to initiate alert messaging based on a hazard lights status and a functional classification of a road. In an example, the alert messaging system uses API calls to obtain information about a road (e.g., name, address, and/or functional classification) from a mapping service using the vehicle location information. In an embodiment, the alert messaging engine stores an alert messaging ruleset that includes a computer-readable ruleset that implements the decision chart shown in FIG. 12.

As used herein, the term "hazard lights" and/or "hazard warning lights," is meant to include a single hazard light on a vehicle or multiple hazard lights on a vehicle. Additionally, in an example, the term "hazard lights" and/or "hazard warning lights," refers to such lights as specifically called out by the United States Department of Transportation (DOT), which sets regulations for vehicle lighting through the Federal Motor Vehicle Safety Standards (FMVSS). The specific standard that covers hazard warning lights, or simply "hazard lights," is FMVSS 108, which is titled "Lamps, Reflective Devices, and Associated Equipment." FMVSS 108 outlines the requirements for various types of vehicle lighting, including hazard warning lights, to ensure visibility, safety, and consistency across different vehicles on the road. The standard specifies factors such as light color, intensity, flashing patterns, and positioning on the vehicle. Regarding hazard warning lights, FMVSS 108 specifies the following requirements:

Color and Intensity: Hazard warning lights are typically amber or yellow in color to indicate caution. FMVSS 108 outlines specific requirements for the intensity of the light emitted by these lights to ensure they are easily visible to other road users, even in adverse conditions.

Flashing Patterns: Hazard warning lights must flash in a specific pattern to alert other drivers to the presence of a hazard. The standard defines the rate at which the lights should flash and the duration of each flash, helping to distinguish hazard lights from other types of lights on a vehicle.

Location: Hazard warning lights are usually located at the front and rear of the vehicle, providing visibility to approaching traffic from both directions. FMVSS 108 specifies the placement and positioning of these lights to maximize their effectiveness.

Activation: The standard outlines the conditions under which hazard warning lights should be activated. Typically, hazard lights are used to indicate that a vehicle is temporarily stopped due to an emergency or a hazard on the road.

Compatibility: Hazard warning lights must be designed and installed in a way that does not interfere with the performance of other required vehicle lighting, ensuring that their activation does not confuse other road users.

Note that FMVSS 108 is a detailed and technical document that provides specific measurements, specifications, and testing methods to ensure compliance with the requirements. In the U.S., vehicle manufacturers must adhere to these standards when designing and manufacturing vehicles for the U.S. market to ensure that their hazard warning lights meet the safety and visibility criteria set by the DOT. In an example, the alert messaging logic is applied based on the status of hazard lights, in which the hazard lights are hazard lights as specified by the U.S. DOT.

In an embodiment, the functional classification logic will periodically send alert messages in an alerting zone for as long as the hazard lights are on. In an example, vehicles are configured to send a message to the cloud-based safety system upon turning on of the hazard lights and upon turning off of the hazard lights. A message from a vehicle indicating that its hazard lights have been turned off can be a trigger to the functional classification logic to end alert messaging related to the vehicle's hazard lights. In an embodiment, the cloud-based safety system may send alert messages related to hazard lights periodically (e.g., a some fixed time increment) until either some predefined amount of time has passed, or a hazard lights off code has been received from the vehicle.

In an example, a vehicle's location is communicated in terms of longitude and latitude coordinates. Although in other embodiments, the vehicle's location may be communicated in terms of a broader area, such as a two-dimensional area, a street name, a city, a zip code, or some other location identifier.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for alerting vehicles, the method comprising:
   receiving, at a cloud computing system, digital data that includes a location of a vehicle and a hazard lights on status of the vehicle;
   determining, by the cloud computing system, a functional classification of a road that corresponds to the location of the vehicle, wherein the digital data is received from the vehicle via a wireless connection; and
   determining, by the cloud computing system, whether to initiate an alert messaging operation in response to the functional classification of the road and the hazard lights on status;
   wherein determining whether to initiate the alert messaging operation involves selecting from available options of:
   initiating the alert messaging operation when the functional classification of the road is determined to be within a first set of functional classifications; and
   not initiating the alert messaging operation when the functional classification of the road is determined to be within a second set of functional classifications.

2. The method of claim 1, wherein the first set of functional classifications includes FC1-FC3, and wherein the second set of functional classifications includes FC4-FC7.

3. The method of claim 1, wherein the first set of functional classifications includes interstate, other freeways or expressways, and other principal arterial roadways, and wherein the second set of functional classifications includes minor arterial, major collector, minor collector, and local roadways.

4. The method of claim 1, wherein functional classifications of roads are functional classifications as defined by a government transportation agency.

5. The method of claim 1, wherein the digital data received at the cloud computing system includes a hazard lights status field.

6. The method of claim 1, wherein the digital data received at the cloud computing system includes a hazards lights on code.

7. The method of claim 1, wherein the hazard lights on status corresponds to hazard lights being activated on the vehicle.

8. The method of claim 1, wherein the alert messaging operation involves indicating that an alert message should be wirelessly transmitted in an alerting zone around the location of the vehicle.

9. The method of claim 8, further comprising determining vehicles that are within the alerting zone, and transmitting the alert message to those vehicles within the alerting zone.

10. The method of claim 1, wherein the digital data is included in a vehicle data message that includes:

a vehicle identifier (ID) that corresponds to the vehicle;
location information that corresponds to the location of the vehicle; and
a hazard lights on code that indicates the vehicle has hazard lights on.

11. A non-transitory computer readable medium comprising instructions to be executed in a computer system, wherein the instructions when executed in the computer system perform a method comprising:
receiving, at a cloud computing system, digital data that includes a location of a vehicle and a hazard lights on status of the vehicle;
determining, by the cloud computing system, a functional classification of a road that corresponds to the location of the vehicle, wherein the digital data is received from the vehicle via a wireless connection; and
determining, by the cloud computing system, whether to initiate an alert messaging operation in response to the functional classification of the road and the hazard lights on status;
wherein determining whether to initiate the alert messaging operation involves selecting from available options of:
initiating the alert messaging operation when the functional classification of the road is determined to be within a first set of functional classifications; and
not initiating the alert messaging operation when the functional classification of the road is determined to be within a second set of functional classifications.

* * * * *